(12) United States Patent
Kudo et al.

(10) Patent No.: US 11,385,102 B2
(45) Date of Patent: Jul. 12, 2022

(54) OPTICAL SYSTEM, AND IMAGING APPARATUS AND IMAGING SYSTEM INCLUDING THE SAME

(71) Applicant: CANON KABUSHIKI KAISHA, Tokyo (JP)

(72) Inventors: Genichiro Kudo, Tochigi (JP); Hiroto Kano, Tochigi (JP); Kazumi Kimura, Saitama (JP); Hiroki Yoshida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/108,782

(22) Filed: Dec. 1, 2020

(65) Prior Publication Data

US 2021/0080322 A1   Mar. 18, 2021

Related U.S. Application Data

(63) Continuation of application No. PCT/JP2019/021657, filed on May 31, 2019.

(30) Foreign Application Priority Data

Jun. 7, 2018 (JP) .............................. JP2018-109863
Mar. 11, 2019 (JP) .............................. JP2019-044280

(51) Int. Cl.
*G01J 3/28* (2006.01)
*G01J 3/02* (2006.01)
(Continued)

(52) U.S. Cl.
CPC ........... *G01J 3/2823* (2013.01); *G01J 3/0208* (2013.01); *G01N 21/88* (2013.01);
(Continued)

(58) Field of Classification Search
CPC .................. G01J 3/2823; G01J 3/0208; G01J 2003/2826; G01N 21/8806; G01N 21/88;
(Continued)

(56) References Cited

U.S. PATENT DOCUMENTS 2,890,622 A   6/1959   Wallin
6,046,808 A * 4/2000  Fateley ..................... G01J 3/02
                                                          356/328
(Continued)

FOREIGN PATENT DOCUMENTS

CN   101680844 A   3/2010
EP   0364951 A2    4/1990
(Continued)

OTHER PUBLICATIONS

Anamorphic format, Wikipedia.org, https://en.wikipedia.org/wiki/Anamorphic_format, downloaded Jan. 11, 2022.
(Continued)

*Primary Examiner* — Dominic J Bologna
(74) *Attorney, Agent, or Firm* — Canon U.S.A., Inc. IP Division

(57) ABSTRACT

Optical system includes front group, light-shielding member, and rear group that are arranged from object side toward image side. The light-shielding member is provided with opening elongated in first direction. The front group has aspherical surface, does not image the object at the opening in first section parallel to the first direction, and forms intermediate image of the object at the opening in second section perpendicular to the first direction. The rear group has diffractive surface that splits light beam that passes through the opening into light beams at different wavelengths in the second section and focuses the light beams on different locations in the second section. The curvature radius of the aspherical surface in the second section at (Continued)

on-axis position in the first direction differs from that at outermost off-axis position in the first direction.

20 Claims, 14 Drawing Sheets

(51) Int. Cl.
| | |
|---|---|
| *G01N 21/88* | (2006.01) |
| *H04N 5/225* | (2006.01) |
| *G02B 3/02* | (2006.01) |
| *G02B 5/18* | (2006.01) |
| *G02B 13/08* | (2006.01) |
| *G02B 17/00* | (2006.01) |
| *G02B 27/42* | (2006.01) |

(52) U.S. Cl.
CPC .......... *G01N 21/8806* (2013.01); *G02B 3/02* (2013.01); *G02B 5/18* (2013.01); *G02B 13/08* (2013.01); *G02B 17/00* (2013.01); *G02B 27/42* (2013.01); *H04N 5/2254* (2013.01); *G01J 2003/2826* (2013.01); *G01N 2021/8845* (2013.01)

(58) Field of Classification Search
CPC ......... G01N 2021/8845; H04N 5/2254; G02B 3/02; G02B 5/18; G02B 13/08; G02B 17/00; G02B 27/42
See application file for complete search history.

(56) References Cited

U.S. PATENT DOCUMENTS

| | | | |
|---|---|---|---|
| 6,084,727 | A | 7/2000 | Cook |
| 7,199,877 | B2 | 4/2007 | Kehoe |
| 8,285,026 | B2 | 10/2012 | Dirix |
| 2005/0013021 | A1 | 1/2005 | Takahashi |
| 2006/0082772 | A1* | 4/2006 | Kehoe .................... G01J 3/0208 356/328 |
| 2010/0046826 | A1* | 2/2010 | Dirix ..................... B07C 5/3422 382/141 |
| 2010/0238440 | A1 | 9/2010 | Oskotsky et al. |
| 2011/0109903 | A1 | 5/2011 | Lee et al. |
| 2018/0066987 | A1* | 3/2018 | Swanson ............... G01J 3/0205 |
| 2021/0080401 | A1* | 3/2021 | Kudo ..................... H04N 5/225 |
| 2021/0080402 | A1* | 3/2021 | Kano ................. G01N 21/8806 |

FOREIGN PATENT DOCUMENTS

| | | |
|---|---|---|
| FR | 2970075 A1 | 7/2012 |
| WO | 2005/086818 A2 | 9/2005 |
| WO | 2005/088264 A1 | 9/2005 |

OTHER PUBLICATIONS

Cylinder lens, Wikipedia.org, https://en.wikipedia.org/wiki/Cylindrical_lens, downloaded Jan. 11, 2022.
Cylindrical lenses offer many focusing options, Optics.org, https://optics.org/article/37057, Dec. 2008.
Reimers, et al., "Freeform spectrometer enabling increased compactness", Light: Science & Applications, 6, e17026, doI: 10.1038/lsa2017.26, (Jul. 2017).

\* cited by examiner

FIG. 7
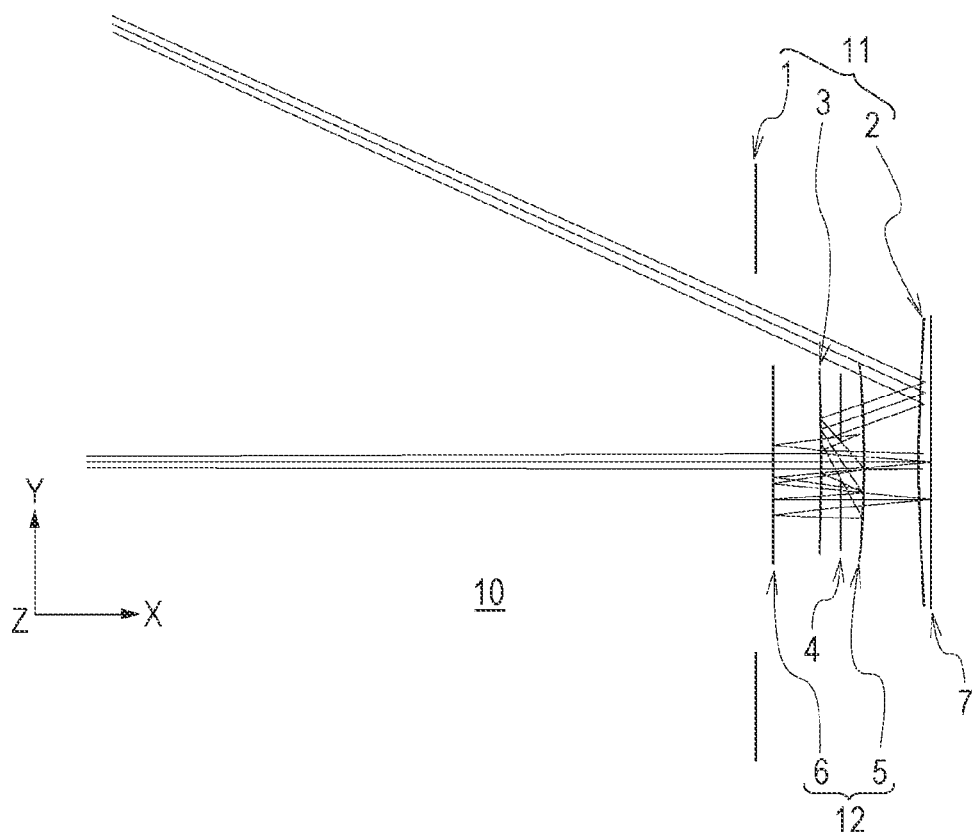
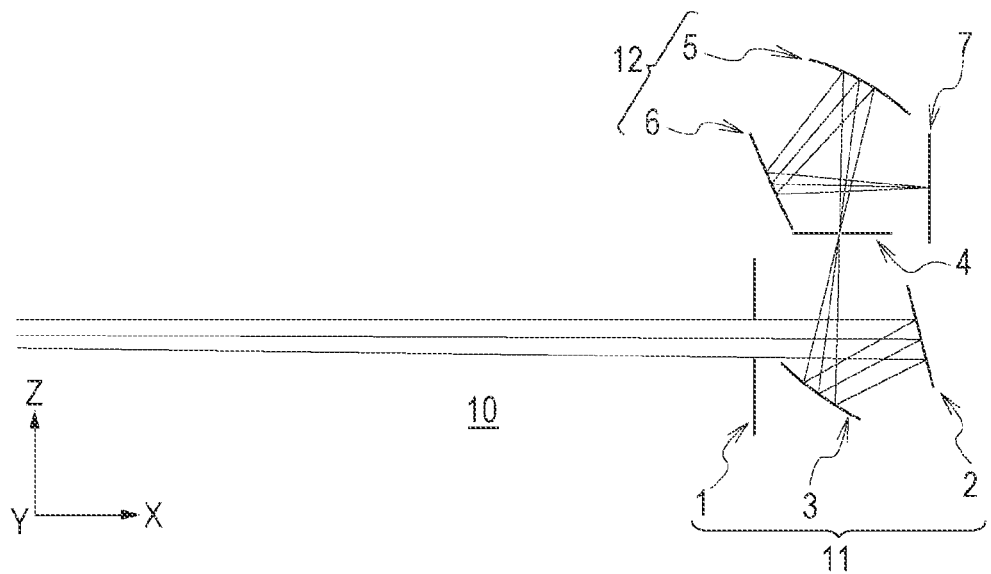

FIG. 9
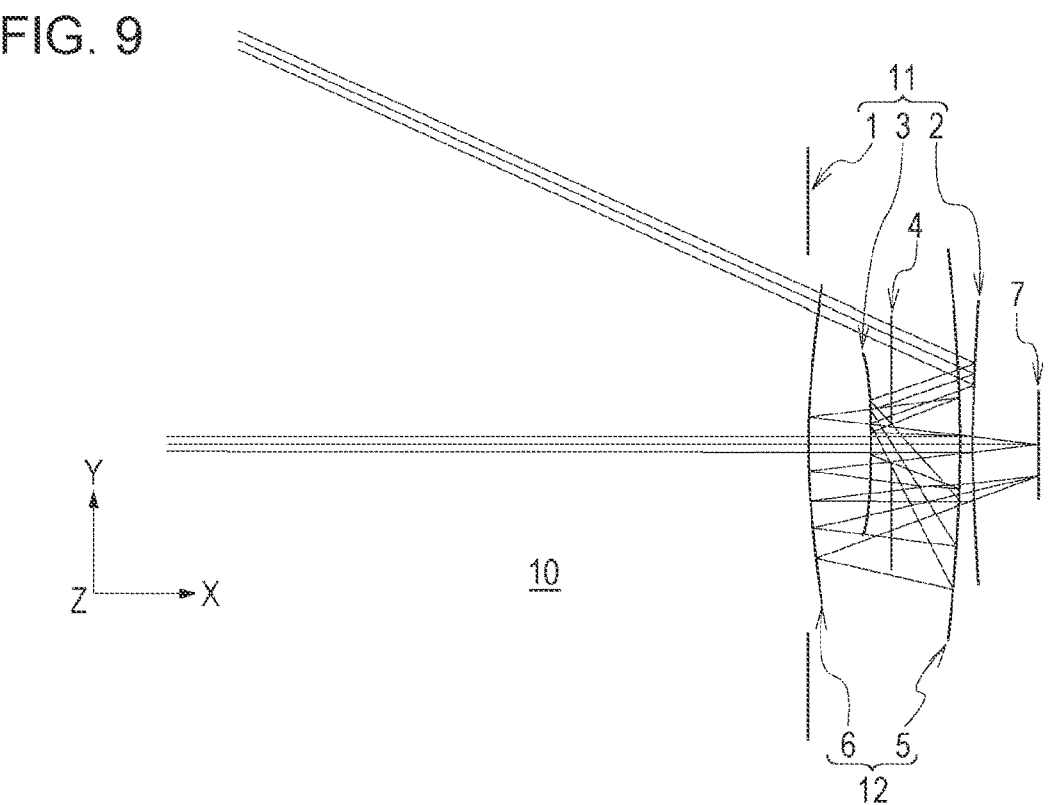
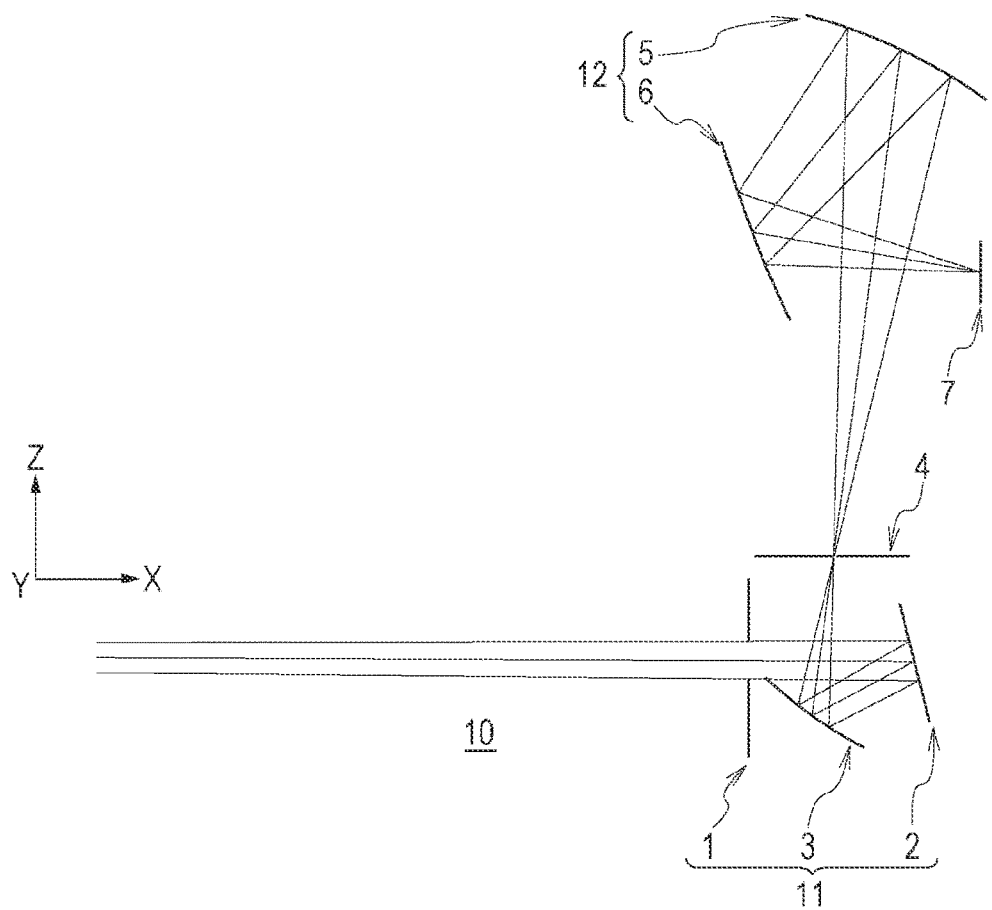

FIG. 11
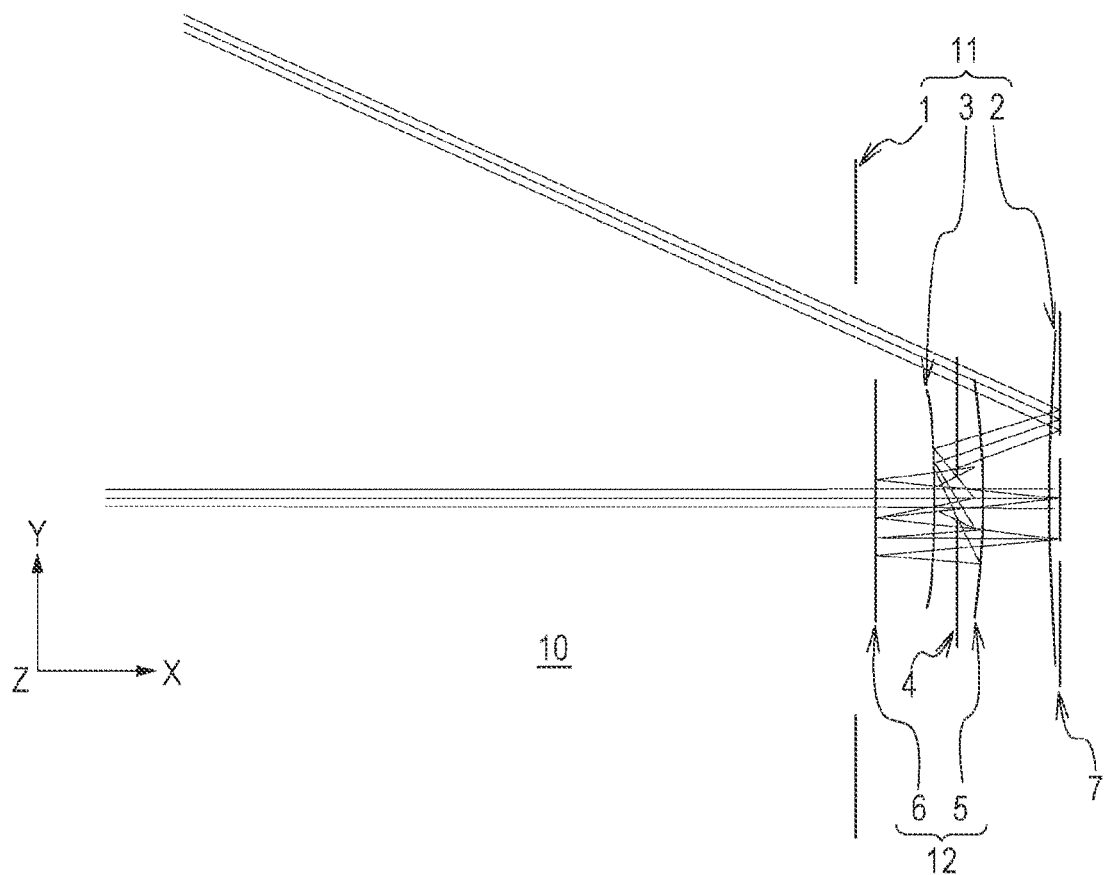
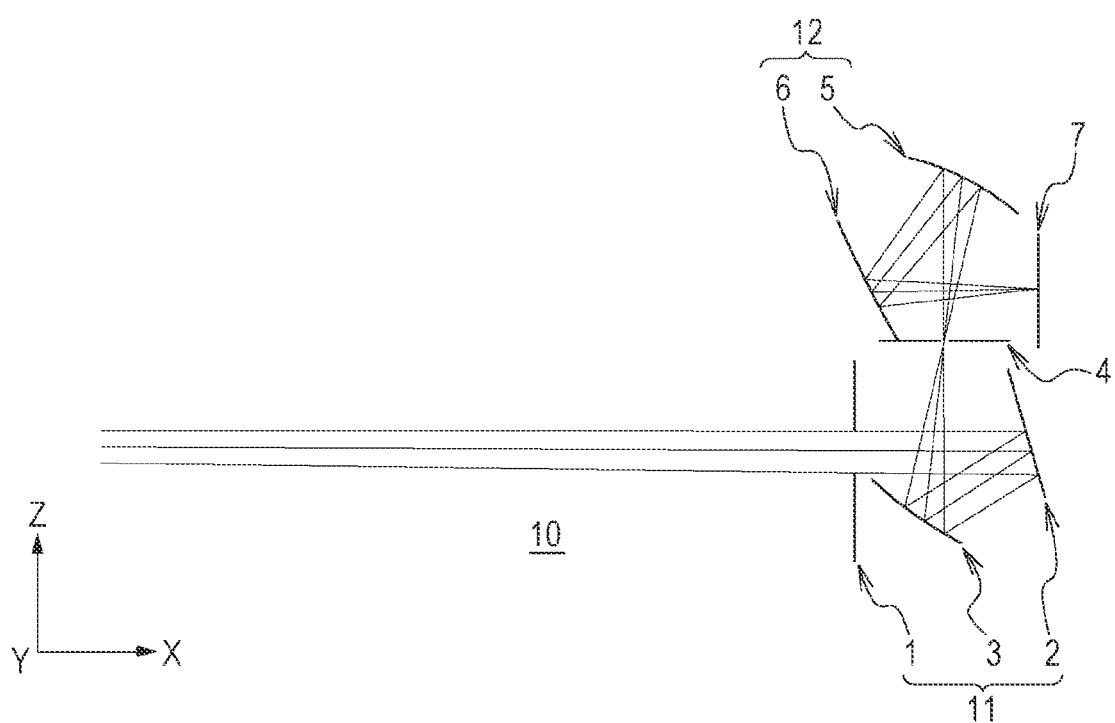

OPTICAL SYSTEM, AND IMAGING APPARATUS AND IMAGING SYSTEM INCLUDING THE SAME

CROSS-REFERENCE TO RELATED APPLICATIONS

This application is a Continuation of International Patent Application No. PCT/JP2019/021657, filed May 31, 2019, which claims the benefit of Japanese Patent Application No. 2018-109863 filed Jun. 7, 2018, and No. 2019-044280 filed Mar. 11, 2019, all of which are hereby incorporated by reference herein in their entirety.

BACKGROUND OF THE INVENTION

Field of the Invention

The present invention relates to an optical system for use in an imaging apparatus that splits a light beam from an object and that obtains image information and is suitable for inspection and evaluation in industrial fields such as manufacturing industry, agricultural industry, and medical industry.

Background Art

A known optical system splits a light beam from a test object (object) into light beams at different wavelengths and focuses the light beams on different locations. U.S. Pat. No. 7,199,877 discloses an optical system that focuses a light beam from an object at a slit that is elongated in one direction by using a cylindrical mirror and subsequently splits the light beam by using a diffraction grating.

In U.S. Pat. No. 7,199,877, however, the curvature of field at the slit due to the cylindrical mirror is not considered. In the case where the curvature of field is generated at the slit, there is a possibility that a part of a light beam is not focused on the slit and is shielded.

SUMMARY OF THE INVENTION

The present invention provides an optical system that can successfully correct the curvature of field at a slit, and an imaging apparatus and an imaging system that include the optical system.

One of aspects of the present invention provides an optical system comprising: a front group; a light-shielding member; and a rear group that are arranged in this order in a direction from a side of an object toward a side of an image, wherein the light-shielding member is provided with an opening elongated in a first direction, the front group has an aspherical surface, does not image the object at the opening in a first section parallel to the first direction, and forms an intermediate image of the object at the opening in a second section perpendicular to the first direction, the rear group has a diffractive surface that splits a light beam that passes through the opening into light beams at different wavelengths in the second section and focuses the light beams on different locations in the second section, and a curvature radius of the aspherical surface in the second section at an on-axis position in the first direction differs from that at an outermost off-axis position in the first direction.

Further features of the present invention will become apparent from the following description of exemplary embodiments with reference to the attached drawings.

BRIEF DESCRIPTION OF THE DRAWINGS

FIG. 7 schematically illustrates principal parts of an optical system in example 2.

FIG. 9 schematically illustrates principal parts of an optical system in example 3.

FIG. 11 schematically illustrates principal parts of an optical system in example 4.

DESCRIPTION OF THE EMBODIMENTS

Figure 1:
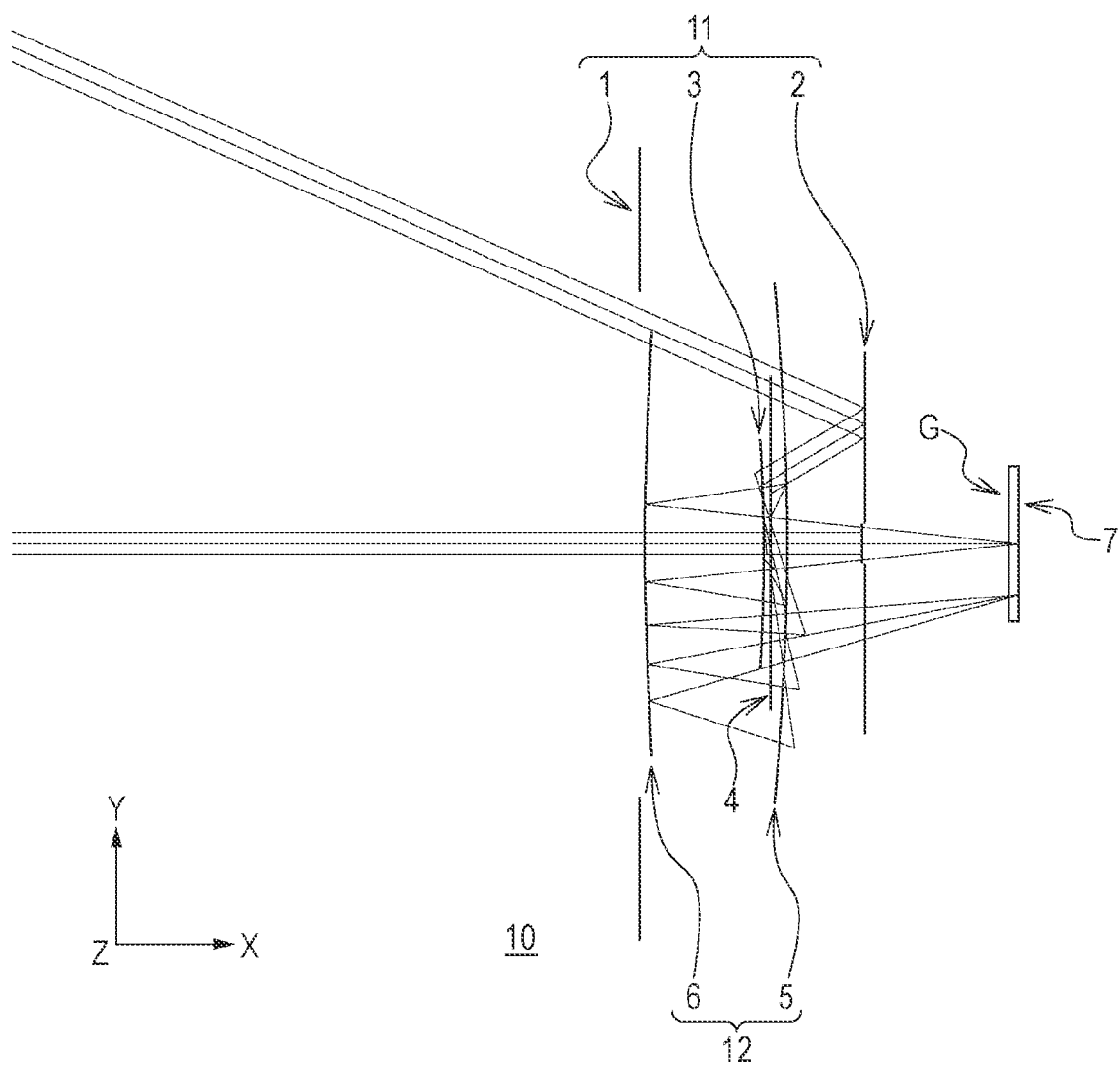
FIG. 1 schematically illustrates principal parts of an optical system according to an embodiment in an XY section.

A preferred embodiment of the present invention will hereinafter be described with reference to the drawings. For convenience, the drawings are made on scales that differ from actual scales. In the drawings, like components are designated by like reference signs, and a duplicated description is omitted.

In the following description, an XYZ coordinate system is defined as an absolute coordinate system, and an xyz coordinate system is defined as a local coordinate system for every optical surface. In the local coordinate system, an x-axis is an axis (an optical axis) in the direction of a normal at a vertex (the origin) of each of optical surfaces, a y-axis is an axis parallel to a Y-axis and perpendicular to the x-axis at the origin, and a z-axis is an axis perpendicular to the x-axis and the y-axis. A Y-direction and a y-direction are also referred to as a first direction (a readout direction), a Z-direction and a z-direction are also referred to as a second direction (a spectral direction), an XY section and an xy section are also referred to as a first section (a readout section), and a ZX section and a zx section are also referred to a second section (a spectral section).

Figure 2:
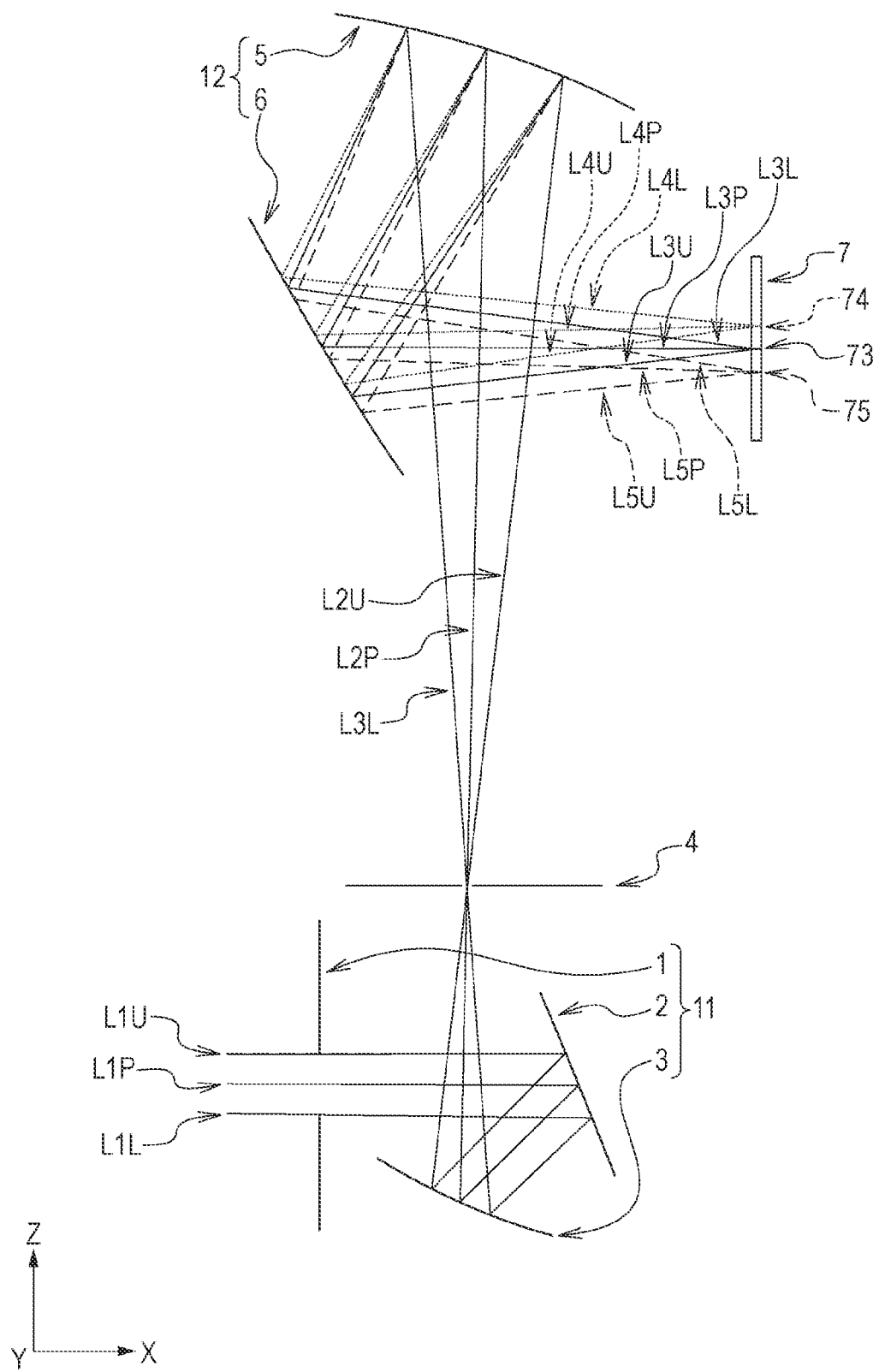
FIG. 2 schematically illustrates the principal parts of the optical system according to the embodiment in a ZX section.

FIG. 1 and FIG. 2 schematically illustrate principal parts of an optical system 10 according to the embodiment of the present invention, FIG. 1 illustrates the first section, and FIG. 2 illustrates the second section. In FIG. 1 and FIG. 2, shapes in sections along optical axes of components are illustrated. For convenience, FIG. 1 illustrates the components on the same paper. In FIG. 1 and FIG. 2, for convenience, diffraction gratings on a diffractive surface are omitted. According to the present embodiment, a test object is disposed near a position of Z=0 on an object surface parallel to a YZ plane, and a light-receiving surface 7 of an imaging element is disposed on an imaging surface of the optical system 10. The test object is illuminated with white light such as sunlight (light that has wavelength components).

The optical system 10 according to the present embodiment includes a front group 11, a light-shielding member (a slit member) 4, and a rear group 12 that are arranged in this order in a direction from a side of an object to a side of an image. The optical system 10 forms an image of the test object on the light-receiving surface (the imaging surface) 7 by focusing a light beam from the test object, not illustrated, which is located in a −X region. The front group 11 has an aperture stop 1, a first reflection surface 2, and a second reflection surface 3. The rear group 12 has a third reflection surface (a diffractive surface) 5 and a fourth reflection surface 6. There is cover glass G just in front of the light-receiving surface 7, but this is dealt with as material that does not contribute to imaging.

The aperture stop 1 is a member that restricts the width of the light beam from the test object in the second direction and is disposed such that an opening surface thereof is perpendicular to an X-direction. However, the aperture stop 1 may be provided outside the optical system 10. In the optical system 10, as illustrated in FIG. 1 and FIG. 2, an entrance port (the aperture stop 1) and an exit port (the light-receiving surface 7) for the light beam are preferably located opposite sides each other with the optical surfaces interposed therebetween. This makes it easy to prevent the light beam from the test object from being shielded by, for example, the imaging element or a wiring line when the optical system 10 is used in an imaging apparatus.

The light-shielding member 4 is provided with an opening (a slit) elongated in the first direction. The light-shielding member 4 limits the angle of view of the optical system 10 in the second section to shield spurious light and serves as an aperture stop that restricts the width of the light beam in the first direction. The width of the opening of the light-shielding member 4 is determined depending on the required amount of light and resolution. The width of the opening of the light-shielding member 4 in the second direction is less than a width (several mm) in the first direction and is preferably several μm to several 100 μm. As for the width of the opening of the light-shielding member 4 in the second direction, when the opening is too thick, the resolution of the light-receiving surface 7 decreases, and when the opening is too thin, an effective light beam that contributes to imaging is likely to be shielded. Accordingly, the width is more preferably no less than 10 μm and no more than 0.2 mm Regions of the aperture stop 1 and the light-shielding member 4 other than the opening correspond to light-shielding surfaces through which light at least in a wavelength band that is used (a designed wavelength band) in the optical system 10 does not passes. A metal plate that has a hole or a glass plate on which chromium is deposited can be used as the aperture stop 1 or the light-shielding member 4. The use of the light-shielding member 4 enables the optical system 10 to form an image of a readout region (a test region) in the form of a line elongated in the first direction.

The first reflection surface 2, the second reflection surface 3, and the fourth reflection surface 6 are reflection surfaces that are obtained by forming reflection coatings on base surfaces that have a free-form surface shape. Each of the base surfaces of the reflection surfaces is formed by processing (such as cutting, polishing, or molding with a mold) a block material composed of glass, resin, or metal. The reflection coatings preferably have spectral reflection properties that achieve sufficient energy efficiency (light use efficiency) at the wavelength band that is used. In the case where the base surfaces have sufficient reflectance at the wavelength band that is used, the reflection coatings may be omitted.

According to the present embodiment, the first reflection surface 2, the second reflection surface 3, and the fourth reflection surface 6 are aspherical surfaces and are specifically anamorphic optical surfaces (anamorphic reflection surfaces) that have different degrees of curvature (power) between the first section and the second section. This enables different optical effects to be exerted in the first section and in the second section. In particular, the first reflection surface 2 and the second reflection surface 3 are secondary-line curvature change surfaces, each of which has the curvature radius in the second section, the curvature radius at an on-axis position in the first direction differing from that at outermost off-axis positions in the first direction. This enables the curvature of field at the opening of the light-shielding member 4 to be successfully corrected and prevents a part of each light beam from being shielded by the light-shielding surface of the light-shielding member 4 (the detail thereof will be described later).

The third reflection surface 5 is the diffractive surface 5 that has a base surface and diffraction gratings that are disposed on the base surface. The base surface of the diffractive surface 5 has a free-form surface shape as in the other reflection surfaces. The diffraction gratings include gratings (projections) that are arranged at a pitch in the order of a submicron to a micron, and the heights of the gratings are in the order of a submicron to a micron. The diffraction gratings can be diffraction gratings a zx section of which has a stair shape, an uneven rectangle shape, a blaze shape, or a SIN wave shape. The shapes of the diffraction gratings are selected in consideration for required diffraction efficiency and ease of manufacturing.

According to the present embodiment, the blaze shape is used because the blaze shape enables both of improvement in the diffraction efficiency and the ease of manufacturing to be relatively readily achieved. As for the diffraction gratings that have the blaze shape, a portion farthest from the base surface in the x direction is referred to as a grating vertex, a portion that reflects (diffracts) incident light is referred to as a blaze surface (a grating surface), and a portion that is adjacent to the blaze surface and that does not contribute to diffraction is referred to as a grating wall surface. As for the diffractive surface 5 according to the present embodiment, the blaze surface faces the light-receiving surface 7 (the image), and the grating wall surface faces the object. Consequently, a light beam at a short wavelength enters the light-receiving surface 7 in a +Z region in FIG. 2, and a light beam at a long wavelength enters the light-receiving surface 7 in a −Z region.

The base surface is formed in the same manner as the other reflection surfaces described above. The diffraction gratings can be formed by processing the base surface by cutting or polishing. However, the diffraction gratings may be formed at the same time the base surface is formed. For example, a diffractive optical element that has the diffraction gratings may be manufactured in a manner in which a fine irregular structure is formed on a surface of a mirror surface part of a mold, and molding is performed by using the mold.

A reflection coating may be formed on a surface of each diffraction grating to improve the diffraction efficiency of the diffractive surface 5. It is preferable that the base surface of the diffractive surface 5 be an aspherical surface and specifically an anamorphic surface that has different degrees of curvature in the xy section and in the zx section. This enables the power to be shared together with the other anamorphic optical surfaces, and the aberration is readily corrected. According to the present embodiment, the base surface of the diffractive surface 5 is an anamorphic surface. However, the base surface may be a flat surface or a spherical surface to regard the ease of manufacturing of the diffraction gratings as important.

Provided that the front group 11 has at least one secondary-line curvature change surface, the first reflection surface 2 or the second reflection surface 3, for example, may be a spherical surface or an anamorphic optical surface, which is not a secondary-line curvature change surface, or any one of them may be removed. To readily obtain the effects of the present invention, however, both of the first reflection surface 2 and the second reflection surface 3 are preferably the secondary-line curvature change surfaces.

Provided that the rear group 12 has at least one diffractive surface, and the base surface of the diffractive surface 5, for example, is an anamorphic surface, the fourth reflection surface 6 may be a spherical surface or may be removed. To correct different degrees of comatic aberration at respective wavelengths due to the diffractive surface 5 successfully, the rear group 12 preferably has an optical surface in addition to the diffractive surface 5, and an anamorphic optical surface is preferably located at a position nearer than the diffractive surface 5 to the image as in the present embodiment. If the front group 11 has the diffractive surface 5, then only light beams at specific wavelengths can pass through the opening of the light-shielding member 4. Accordingly, it is necessary for the rear group 12 to have the diffractive surface 5.

To inhibit aberration from occurring in the optical system 10 in a manner in which the optical surfaces share power, all of the optical surfaces of the front group 11 and the rear group 12 are preferably anamorphic optical surfaces. The structures of the front group 11 and the rear group 12 are not limited to the above description, and the optical surfaces of the groups may be increased or decreased in number. To decrease the size of the entire system and the number of components, the front group 11 and the rear group 12 preferably have respective two reflection surfaces as in the present embodiment.

According to the present embodiment, the size of the optical system 10 is decreased by bending an optical path with the result that all of the optical surfaces are reflection surfaces, and chromatic aberration is inhibited from occurring. To decrease the size of the optical system 10 in this case, as illustrated in FIG. 2, the reflection surfaces are preferably located such that the optical path itself intersects (has a shape of a character of "4") in the front group 11 and in the rear group 12. A prism or an internal reflection mirror may be used as a reflection member that has a reflection surface as needed. To inhibit the chromatic aberration from occurring as described above, however, the reflection member is preferably an external reflection mirror such that the reflection surface is exposed to air. At least one optical surface may be a refractive surface (transmissive surface) as needed.

In particular, in the rear group 12, a holding member and a wiring line, not illustrated, are disposed around the light-shielding member 4 and the light-receiving surface 7, and it is difficult to ensure enough space for disposing refractive optical elements. Even through enough space is ensured, it is necessary for the refractive optical elements to be disposed to correct the chromatic aberration successfully, and the size of the entire system increases. Accordingly, at least all of the optical surfaces of the rear group 12 are preferably reflection surfaces. Moreover, it is more preferable that all of the optical surfaces of the front group 11 be reflection surfaces.

The effects of the optical system 10 will be described with reference to FIG. 1 and FIG. 2.

A light beam that is emitted from the test object passes through the opening of the aperture stop 1, is subsequently reflected from the first reflection surface 2 and the second reflection surface 3 and reaches the light-shielding member 4. At this time, the front group 11 does not image the test object at the opening of the light-shielding member 4 in the first section (the XY section) but forms an intermediate image of the test object at the opening of the light-shielding member 4 in the second section (the ZX section). That is, in the front group 11, the position of focus does not coincide with the object surface in the first section. Consequently, the intermediate image (a line image) in the form of a line elongated in the first direction is formed at the opening of the light-shielding member 4. The meaning of "at the opening" described herein is not limited to the precise position of the opening but includes a position near the opening and slightly away from the opening in the optical axis (substantially at the opening).

The light beam that passes through the opening of the light-shielding member 4 is split into light beams at different wavelengths by using the diffractive surface 5 in the second section. At this time, the light beam that enters the diffractive surface 5 is subjected to a spectral effect only in the z-direction and is not subjected to the spectral effect in the y-direction, because the diffraction gratings on the diffractive surface 5 include the gratings (the ridge lines) that are arranged in the z-direction. The light beams from the diffractive surface 5 are reflected from the fourth reflection surface 6 and enter the light-receiving surface 7 that is located on the imaging surface. At this time, the light beams at the different wavelengths are focused on different locations on the light-receiving surface 7 in the second section. That is, the optical system 10 according to the present embodiment enables images for the respective wavelengths to be formed on the light-receiving surface 7, and the light-receiving surface 7 enables image information for the respective wavelengths to be obtained.

The optical system 10 according to the present embodiment thus exerts different optical effects in the first section along the readout direction and in the second section along the spectral direction. Specifically, in the first section, the test object is not imaged at the opening of the light-shielding member 4 once but is imaged on the light-receiving surface 7, and in the second section, the test object is imaged at the opening of the light-shielding member 4 once and reimaged on the light-receiving surface 7 again. That is, in the first section, the test object is imaged once, but in the second section, the test object is imaged twice.

With this structure, the convergence of the light beam (the light beam that enters the opening) that passes through the opening of the light-shielding member 4 is not limited in the first section, and the degree of freedom of design of the optical system 10 can be increased. Accordingly, the test object can be imaged on the light-receiving surface 7 by sharing the power appropriately by the front group 11 and the rear group 12, and various kinds of aberration is readily corrected. Accordingly, the angle of view can be increased (the readout region can be widened) and an imaged image can be precise.

Specifically, in the front group 11, the position of focus in the first section does not coincide with the object surface, and the light beam that passes through the opening of the light-shielding member 4 can be that of non-parallel light. This enables the angle of view in the first section to be readily increased. If the light beam that passes through the opening of the light-shielding member 4 is that of parallel light, then the rear group 12 needs to include a large number of optical elements to increase the angle of view of the optical system 10, and the size of the entire system increases. According to the present embodiment, the light beam that passes through the opening of the light-shielding member 4 is diverging light to increase the angle of view. The light beam that passes through the opening of the light-shielding member 4 may be converging light as needed.

In the case where the test object is imaged at the opening of the light-shielding member 4 once also in the first section, the front group 11 and the rear group 12 need to correct the aberration individually. Accordingly, the degree of freedom of design of the optical surface decreases, for example, the power of each optical surface needs to be increased, and it is difficult to increase the angle of view of the optical system 10. It is not necessary to increase the angle of view in the second section, and NA can be increased by imaging the test object at the opening of the light-shielding member 4 once.

With the structure described above, the power of the front group 11 and the power of the rear group 12 differ between the first section and the second section. For this structure, the front group 11 and the rear group 12 need to have respective anamorphic optical surfaces. In this case, it is preferable that power be actively provided to the anamorphic optical surface of the front group 11 not only in the second section, but also in the first section (the absolute value of curvature is more than 0). The sign of the power of the front group 11 and the sign of the power of the rear group 12 more preferably differ from each other in the first section.

Specifically, in the second section, the front group 11 and the rear group 12 need to have positive power in order that the test object is imaged at the opening of the light-shielding member 4 once and is subsequently reimaged on the light-receiving surface 7. In the first section, however, it is not necessary to image the test object at the opening of the light-shielding member 4 once. Accordingly, to further increase the angle of view, the front group 11 preferably has negative power, and the rear group 12 preferably has positive power. Consequently, the optical system 10 is of a retrofocus type in the first section, the focal length of the entire system decreases, and the angle of view can increase. In the case where the test object is sufficiently separated from the optical system 10, however, the optical system 10 may be a telephoto optical system in which the front group 11 has positive power, and the rear group 12 has negative power.

A situation in which a light beam is split by using the diffractive surface 5 will be described with reference to FIG. 2. A case that is considered herein is that a white light beam that is emitted from a single point on the test object is split into light beams at wavelengths λ1 [nm], λ2 [nm], and λ3 [nm] (λ2<λ1<λ3). As for the light beams, FIG. 2 illustrates only principal rays and marginal rays.

A principal ray L1P and marginal rays L1U and L1L of the white light beam that is emitted from the test object form an intermediate image in the form of a line at the opening of the light-shielding member 4 after interfering with the aperture stop 1, the first reflection surface 2, and the second reflection surface 3. A principal ray L2P and marginal rays L2U and L2L that pass through the opening of the light-shielding member 4 are split into rays L3P, L3U, and L3L at the wavelength λ1, rays L4P, L4U, and L4L at the wavelength λ2, and rays L5P, L5U, and L5L at the wavelength λ3 by using the diffractive surface 5. The rays at the wavelength λ1, the wavelength λ2, and the wavelength λ3 are focused on a first location 73, a second location 74, and a third location 75 on the light-receiving surface 7.

The effects and the shapes of the first reflection surface 2 and the second reflection surface 3 will now be described in detail.

Figure 3:
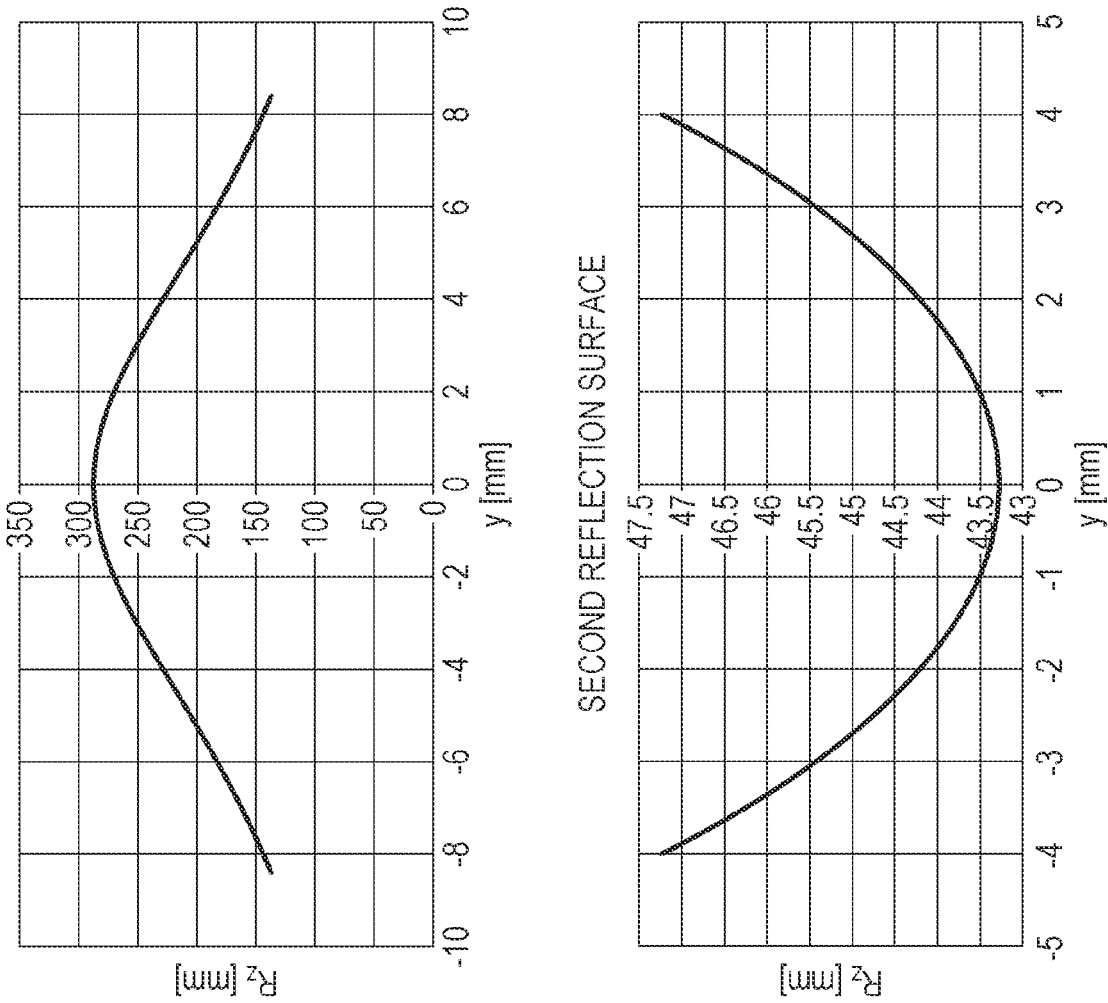
FIG. 3 illustrates the radii of curvature of first and second reflection surfaces in a second section according to the embodiment.

FIG. 3 illustrates the radii of curvature of the first reflection surface 2 and the second reflection surface 3 of the front group 11 in the second section (the zx section). In FIG. 3, the horizontal axis represents a position [mm] in the y-direction with respect to the origin of the local coordinate system of each reflection surface, and the vertical axis represents the radius $R_z$ [mm] of curvature of each reflection surface in the second section.

As illustrated in FIG. 3, the first reflection surface 2 and the second reflection surface 3 according to the present embodiment are the secondary-line curvature change surfaces, each of which has the curvature radius in the second section, the curvature radius at the on-axis position in the first direction differing from that at the outermost off-axis positions in the first direction. This enables correction of the curvature of field: in the second section, the position of focus of the light beam at the on-axis position in the opening of the light-shielding member 4 shifts from those at the outermost off-axis positions in the direction of the optical axis. This prevents the light beams that are reflected from the second reflection surface 3 at the outermost off-axis positions, for example, from being focused on the front or rear of the opening of the light-shielding member 4 and prevents part thereof from being shielded by the light-shielding surface of the light-shielding member 4.

In this case, as illustrated in FIG. 3, the radii of curvature of the first reflection surface 2 and the second reflection surface 3 preferably change from the on-axis position toward the outermost off-axis positions. This enables the curvature of field in the second section to be successfully corrected over the entire region from the on-axis position to the outermost off-axis positions in the first direction. That is, positions of focus of the light beams in the second section over the entire region from the on-axis position to the outermost off-axis positions can be aligned at the opening of the light-shielding member 4. In this case, as illustrated in FIG. 3, it is preferable that the curvature radius of each reflection surface be monotonically (continuously) changed. If the curvature radius of each reflection surface does not monotonically change, then the reflection surface has the inflection point, the reflection surface is difficult to form, and the wavefront aberration is likely to occur near the inflection point.

To correct the curvature of field at the opening of the light-shielding member 4, the curvature radius at the on-axis position is differentiated from the curvature radius at least at one of the outermost off-axis positions. To correct the curvature of field more successfully, the curvature radius at the on-axis position is preferably differentiated from the radii of curvature at the two outermost off-axis positions (of both ends) as in the present embodiment. In this case, a relationship (the direction of change) in magnitude between the curvature radius at the on-axis position and the curvature radius at one of the outermost off-axis positions is preferably the same as a relationship in magnitude between the curvature radius at the on-axis position and the curvature radius at the other outermost off-axis position. That is, the radii of curvature at both of the outermost off-axis positions are preferably larger than the curvature radius at the on-axis position, or the radii of curvature at both of the outermost off-axis positions are preferably smaller than the curvature radius at the on-axis position.

The optical surface of the front group 11 that has the smallest curvature radius (the maximum power) in the second section is preferably the secondary-line curvature change surface. According to the present embodiment, the curvature radius of the second reflection surface 3 is smaller than the curvature radius of the first reflection surface 2, and the curvature of field can be readily corrected when at least the second reflection surface 3 is the secondary-line curvature change surface. In the case where the secondary-line curvature change surfaces are provided as in the present embodiment, the change in the curvature radius is preferably determined depending on the magnitude of the curvature radius of each reflection surface.

According to the present embodiment, as illustrated in FIG. 3, the change in the curvature radius of the second reflection surface 3 that has a small curvature radius is smaller than the change in the curvature radius of the first reflection surface 2 that has a large curvature radius. According to the present embodiment, the curvature radius of the first reflection surface 2 in the second section decreases in a direction from the on-axis position toward each outermost off-axis position, and the curvature radius of the second reflection surface 3 increases in a direction from the on-axis position toward each outermost off-axis position. The positions of focus of the light beams from the second reflection surface 3 in the second section can substantially coincide with positions in the opening of the light-shielding member 4 over the entire region from the on-axis position to the outermost off-axis positions in the first direction. A method of changing the curvature radius of each reflection surface is not limited to that described according to the present embodiment and is preferably determined depending on the design of the entire optical system.

Figure 4:
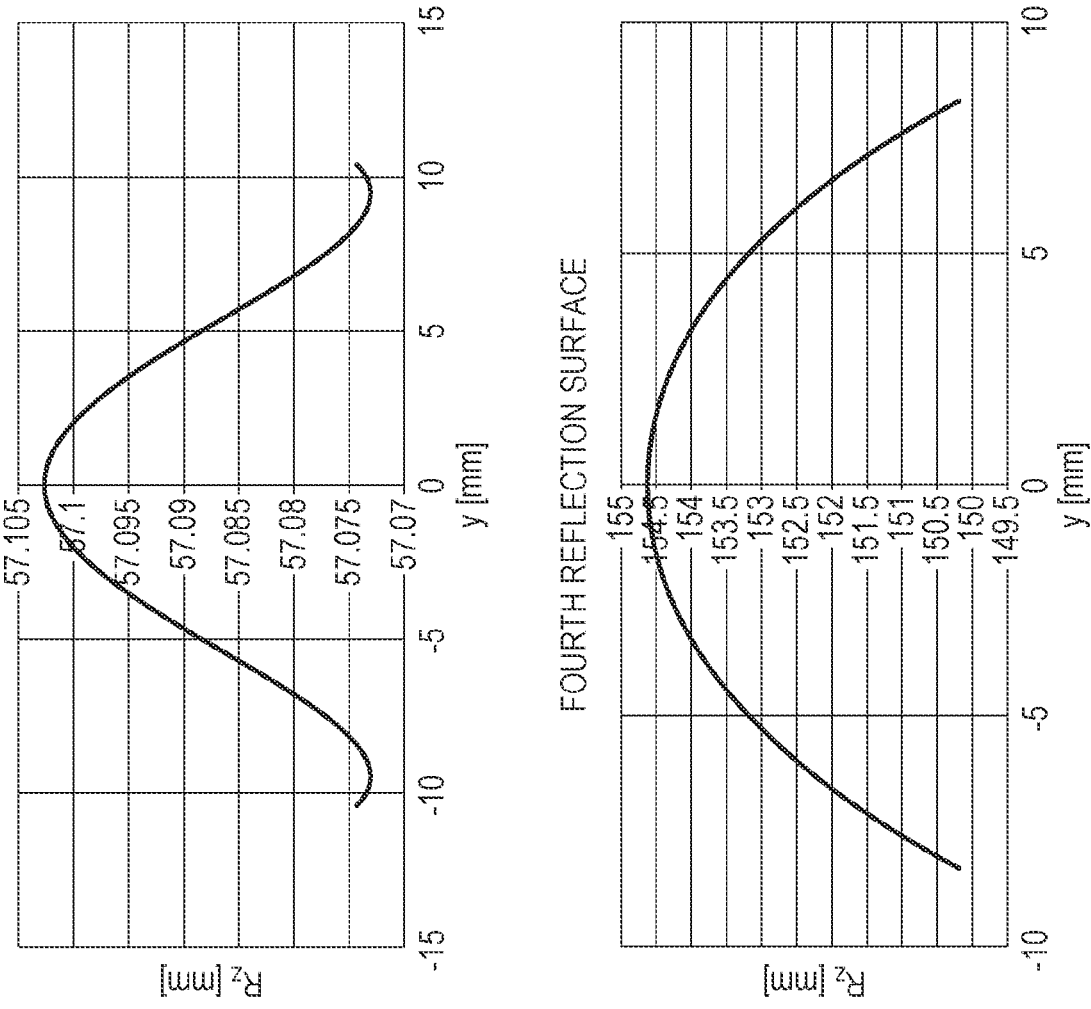
FIG. 4 illustrates the radii of curvature of third and fourth reflection surfaces in the second section according to the embodiment.

FIG. 4 illustrates the radii of curvature of the base surface of the third reflection surface 5 and the fourth reflection surface 6 of the rear group 12 in the second section as in FIG. 3. As illustrated in FIG. 4, the front group 11 and the rear group 12 have the secondary-line curvature change surfaces, and the curvature of field on the light-receiving surface 7 in the second section can be corrected. According to the present embodiment, as illustrated in FIG. 4, the radii of curvature of the third reflection surface 5 and the fourth reflection surface 6 are changed so as to decrease in a direction from the on-axis position to each outermost off-axis position.

As illustrated in FIG. 4, the curvature radius of the base surface of the third reflection surface 5 increases near each outermost off-axis position, but this portion does not contribute to imaging (a non-effective region). That is, the curvature radius of a portion of the base surface of the third reflection surface 5 that contributes to imaging (an effective region) monotonically decreases in the direction from the on-axis position to each outermost off-axis position. The method of changing the curvature radius of each reflection surface is not limited to that described according to the present embodiment as in the front group 11 and is preferably determined depending on the design of the entire optical system.

According to the present embodiment, as illustrated in FIG. 4, the curvature radius of the base surface of the third reflection surface 5 at the on-axis position is differentiated from that at the outermost off-axis positions, and the power (the refractive power) of the third reflection surface 5 due to refraction at the on-axis position is differentiated from that at the outermost off-axis positions. The power (the diffractive power) of the third reflection surface 5 due to diffraction at the on-axis position is preferably the same as that at the outermost off-axis positions. In the case where the diffractive power at the on-axis position differs from that at the outermost off-axis positions, spectral performance at the on-axis position differs from that at the outermost off-axis positions, and there is a possibility that good spectral information (image information) is not obtained. According to the present embodiment, the diffraction gratings on the third reflection surface 5 include the gratings (the ridge lines) that are arranged in the z-direction as described above, and the diffractive power at the on-axis position is consequently the same as that at the outermost off-axis positions. However, the meaning of the "same" described herein includes not only precisely the same but also substantially the same.

Figure 5:
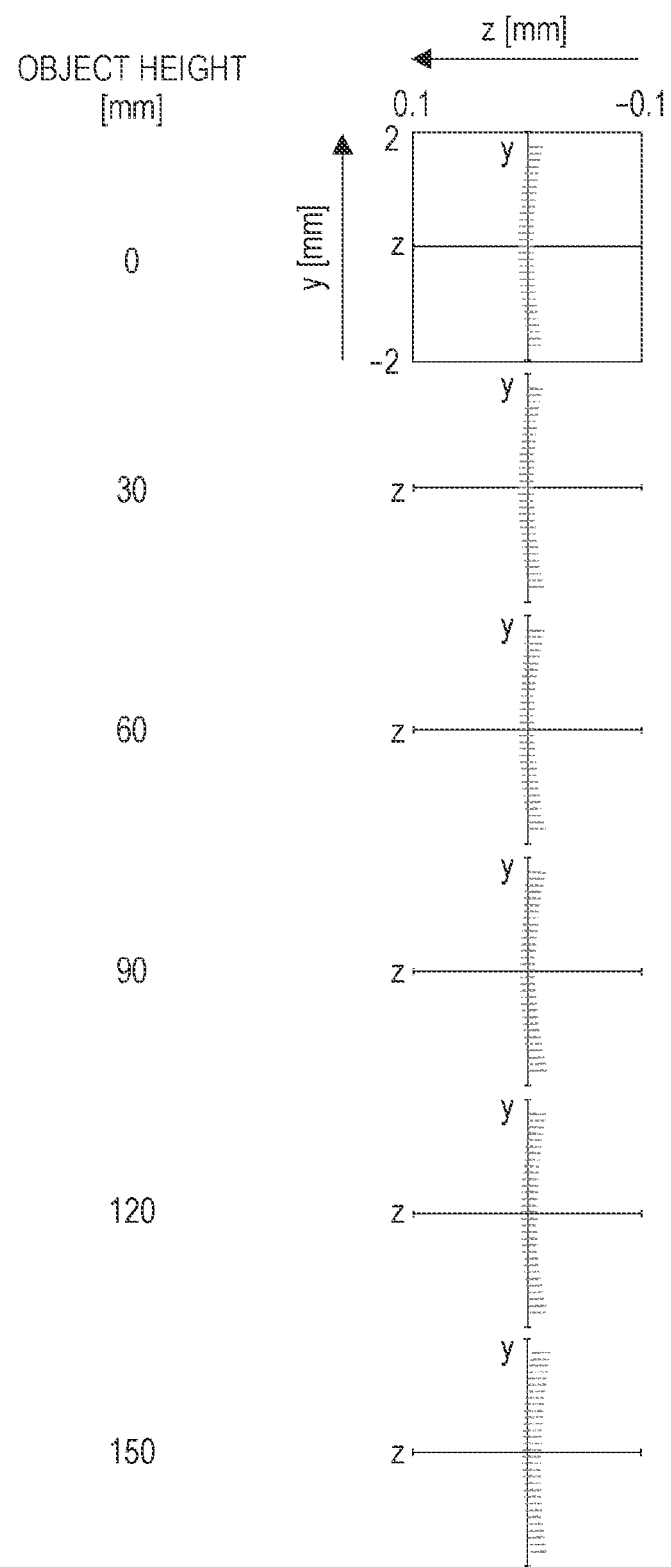
FIG. 5 illustrates a spot diagram at an opening of a light-shielding member according to the embodiment.

FIG. 5 illustrates distribution (a spot diagram) of the light beams from object heights at the opening of the light-shielding member 4 according to the present embodiment. In FIG. 5, the horizontal axis represents a position [mm] in the z-direction (the transverse direction) at the opening of the light-shielding member 4, the vertical axis represents a position [mm] in the y-direction (the longitudinal direction) at the opening of the light-shielding member 4, and points represent intersection points between the opening of the light-shielding member 4 and the rays.

According to the present embodiment, the width of the opening of the light-shielding member 4 in the y-direction is 3.6 mm, and as illustrated in FIG. 5, the light beams at the opening extend to a range of 3.6 mm (±1.8) in the y-direction. It is understood that the width of the opening of the light-shielding member 4 in the z-direction is 0.05 mm, which is sufficiently larger than the diameters of the light beams, and that the light beams are not shielded by the light-shielding member 4 in the z-direction and entirely pass through the opening.

The optical system 10 according to the present embodiment, in which the front group 11 has the secondary-line curvature change surfaces, can successfully correct the curvature of field at the opening of the light-shielding member 4 and can achieve good optical performance even with a simple structure. Generally, in the case where the angle of view of the optical system is increased, the curvature of field is generated strongly, and the optical system 10 according to the present embodiment is particularly advantageous to increase the angle of view.

EXAMPLE 1

An optical system 10 in example 1 of the present invention will be described. The optical system 10 in the present example has the same structure as that of the optical system 10 according to the embodiment described above.

In the present example, the distance from the test object to the aperture stop 1 (an object distance) is 300 mm, the width of the readout region in the first direction is 300 mm, and the angle of view in the first section is ±24.17°. In the present example, the wavelength band that is used is 400 nm to 1000 nm, and the width of an imaging region (an incident region) for a light beam on the light-receiving surface 7 in the second direction is 2.7 mm.

In the present example, the combined focal lengths of the front group 11 and the rear group 12 in the first section are −16.27 mm and 28.30 mm, and the combined focal lengths of the front group 11 and the rear group 12 in the second section are 19.99 mm and 25.76 mm As for the optical system 10 in the present example, intermediation in the second section enables the imaging performance to be improved, and the retrofocus type in the first section enables the angle of view to be increased (the readout region is widened).

Expressions for the shapes of the optical surfaces of the optical system 10 in the present example will now be described. The expressions for the shapes of the optical surfaces are not limited to the following description, and the optical surfaces may be designed by using other expressions as needed.

In the present example, the shapes (the primary-line shapes) of the base surfaces of the first reflection surface 2, the second reflection surface 3, the third reflection surface (the diffractive surface) 5, and the fourth reflection surface 6 in the first section are expressed as an expression described below in the local coordinate system thereof.

$$x = \frac{y^2/R_y}{1+\sqrt{1-(1+K_y)(y/R_y)^2}} + B_2 y^2 + B_4 y^4 + B_6 y^6 \quad \text{[Math. 1]}$$

$R_y$ is the curvature radius (the radius of primary-line curvature) in the xy section, and $K_y$, $B_2$, $B_4$, and $B_6$ are aspherical surface coefficients in the xy section. The aspherical surface coefficients $B_2$, $B_4$, and $B_6$ may have different values between both regions (a −y region and a +y region) in the x-axis as needed. This enables the primary-line shapes to be asymmetric in the y-direction with respect to the x-axis. In the present example, secondary to senary aspherical surface coefficients are used, but a higher degree of aspherical surface coefficient may be used as needed.

In the present example, the shape (the secondary-line shape) of the base surface of each optical surface in the second section at a position in the y-direction is expressed as an expression described below.

$$s = \frac{z^2/r'}{1+\sqrt{1-(1+K_z)(z/r')^2}} + \sum\sum M_{jk} y^j z^k \quad \text{[Math. 2]}$$

$K_z$ and $M_{jk}$ are aspherical surface coefficients in the zx section. r' is the curvature radius (the radius of secondary-line curvature) in the zx section at a position y away from the optical axis in the y-direction and is expressed as an expression described below.

$$\frac{1}{r'} = \frac{1}{r} + E_2 y^2 + E_4 y^4 \quad \text{[Math. 3]}$$

r is the radius of secondary-line curvature on the optical axis, and $E_2$ and $E_4$ are secondary-line change coefficients. In the expression (Math. 3), the first term of the right-hand side of the expression (Math. 2) is zero when r=0 is satisfied. The secondary-line change coefficients $E_2$ and $E_4$ may have different values between the −y region and the +y region as needed. This enables the aspherical surface degree of the secondary-line shape to be asymmetric in the y-direction. The expression (Math. 3) includes only even terms but may include an odd term as needed. A high degree of secondary-line change coefficient may be used as needed.

The primary term of z in the expression (Math. 2) contributes to the tilt amount (the secondary-line tilt amount) of each optical surface in the zx section. Accordingly, $M_{jk}$ has different numerical values between the −y region and the +y region, and the secondary-line tilt amount can be consequently changed asymmetrically in the y-direction. The secondary-line tilt amount may be changed asymmetrically by using an odd term. The quadratic term of z in the expression (Math. 2) contributes to the radius of secondary-line curvature of each optical surface. Accordingly, the radius of secondary-line curvature is provided to the optical surface by using only the quadratic term of z in the expression (Math. 2) instead of the expression (Math. 3) to simplify the design of the optical surface.

The shapes of the diffraction gratings on the diffractive surface 5 are not particularly limited provided that the shapes are expressed by a phase function based on known diffractive optical theory. In the present example, the shapes of the diffraction gratings on the diffractive surface 5 are defined as a phase function ϕ described below, where λ [mm] is a fundamental wavelength (a designed wavelength), and C1 is a phase coefficient in the zx section. According to the present embodiment, however, the diffraction order of the diffraction gratings is 1.

$$\phi=(2\pi/\lambda)\times(C1\times z)$$

The fundamental wavelength described herein means a wavelength for determining the height of each diffraction grating and is determined based on, for example, spectral properties of illumination light to the test object, the spectral reflectance of each reflection surface other than the diffractive surface 5, the spectral light-receiving sensitivity of each imaging element including the light-receiving surface 7, and the required diffraction efficiency. That is, the fundamental wavelength corresponds to a wavelength that is regarded as important during detection with the light-receiving surface 7. In the present example, the fundamental wavelength λ is 542 nm, and a visible region in the wavelength band that is used can be predominantly observed. However, the fundamental wavelength may be, for example, about 850 nm so that a near infrared region is predominantly observed, or the fundamental wavelength may be about 700 nm so that a region from the visible region to the near infrared region can be observed in a well-balanced manner.

Table 1 illustrates the position of the vertex of each optical surface of the optical system 10 in the present example, the direction of a normal at the vertex, and the curvature radius in each section. In Table 1, the position of the vertex of each optical surface is represented by distances X, Y, and Z [mm] from the origin in an absolute coordinate system, and the direction of the normal (x-axis) is represented by an angle θ [deg] with respect to the X-axis in the ZX section along the optical axis. d [mm] represents the distance (the surface distance) between the optical surfaces, and d' [mm] represents the distance between the reflection points of the principal rays on the optical surfaces. $R_y$ and $R_z$ represent the radii of curvature in the XY section and in the ZX section at the reflection points of the principal rays. When the value of the curvature radius of each reflection surface is positive, a concave surface is represented, and when the value is negative, a convex surface is represented.

TABLE 1

|  |  | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.458 | 15.473 |  |  |
| FIRST REFLECTION SURFACE | 2 | 15.458 | 0.000 | −1.751 | −157.83 | 9.802 | 9.797 | −309.32 | 287.2587 |
| SECOND REFLECTION SURFACE | 3 | 8.530 | 0.000 | −8.684 | 66.71 | 18.589 | 18.578 | −38.6807 | 43.27758 |
| LIGHT-SHIELDING MEMBER | 4 | 8.924 | 0.000 | 9.900 | 90.00 | 49.797 | 49.794 |  |  |
| THIRD REFLECTION SURFACE | 5 | 10.058 | 0.000 | 59.684 | −107.49 | 20.134 | 20.144 | 65.54156 | 57.12943 |
| FOURTH REFLECTION SURFACE | 6 | 0.335 | 0.000 | 42.054 | 30.40 | 25.247 | 25.239 | 159.9746 | 154.6239 |
| COVER GLASS | G | 25.582 | 0.000 | 41.900 | 0.00 | 0.600 | 0.600 |  |  |
| LIGHT-RECEIVING SURFACE | 7 | 26.182 | 0.000 | 41.900 | 0.00 |  |  |  |  |

Table 2 represents the shape of each optical surface of the optical system 10 in the present example.

TABLE 2

|  | FIRST REFLECTION SURFACE | SECOND REFLECTION SURFACE | THIRD REFLECTION SURFACE | FOURTH REFLECTION SURFACE |
|---|---|---|---|---|
| $R_y$ | −3.093E+02 | −3.868E+01 | 6.554E+01 | 1.600E+02 |
| $K_y$ | −1.000E+00 | −1.000E+00 | −1.000E+00 | −1.000E+00 |
| $B_2$ | 0.000E+00 | 0.000E+00 | 0.000E+00 | 0.000E+00 |
| $B_4$ | 8.067E−06 | −1.590E−05 | 5.840E−07 | −8.601E−07 |
| $B_6$ | −5.811E−11 | −3.260E−07 | −1.134E−11 | 4.309E−10 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | 1.398E−04 | 2.471E−04 | −1.632E−05 | −7.584E−05 |
| $M_{41}$ | 6.002E−07 | 2.947E−06 | −1.121E−08 | 7.866E−09 |
| $M_{02}$ | 1.741E−03 | 1.155E−02 | 8.752E−03 | 3.234E−03 |
| $M_{22}$ | 2.824E−05 | −5.717E−05 | 1.120E−06 | 1.186E−06 |
| $M_{42}$ | −1.558E−08 | 3.920E−08 | −3.108E−10 | 3.801E−09 |
| $M_{03}$ | −1.283E−05 | 1.259E−04 | 1.370E−05 | −3.088E−05 |
| $M_{23}$ | 1.542E−06 | 1.055E−05 | 0.000E+00 | 1.564E−08 |
| $M_{43}$ | −1.167E−08 | 1.254E−07 | 0.000E+00 | −1.896E−10 |
| $M_{04}$ | 1.214E−04 | −1.906E−04 | 6.180E−07 | 1.353E−06 |
| $M_{24}$ | 1.459E−07 | −2.301E−06 | 0.000E+00 | 5.803E−10 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 0.000E+00 | 0.000E+00 | 0.000E+00 |
| $M_{46}$ | 0.000E+00 | 0.000E+00 | 0.000E+00 | 0.000E+00 |
| C1 |  |  | 6.331E−02 |  |
| λ |  |  | 5.420E−04 |  |

Table 3 illustrates the diameters [mm] of the opening of the aperture stop 1, the opening of the light-shielding member 4, and the light-receiving surface 7 in the y-direction and in the z-direction. In the present example, the opening of the aperture stop 1, the opening of the light-shielding member 4, and the light-receiving surface 7 are rectangular.

TABLE 3

|  | APERTURE STOP | LIGHT-SHIELDING MEMBER | LIGHT-RECEIVING SURFACE |
|---|---|---|---|
| DIAMETER (y) | 35.2 | 3.6 | 7.2 |
| DIAMETER (z) | 3.6 | 0.05 | 5.4 |

Figure 6:
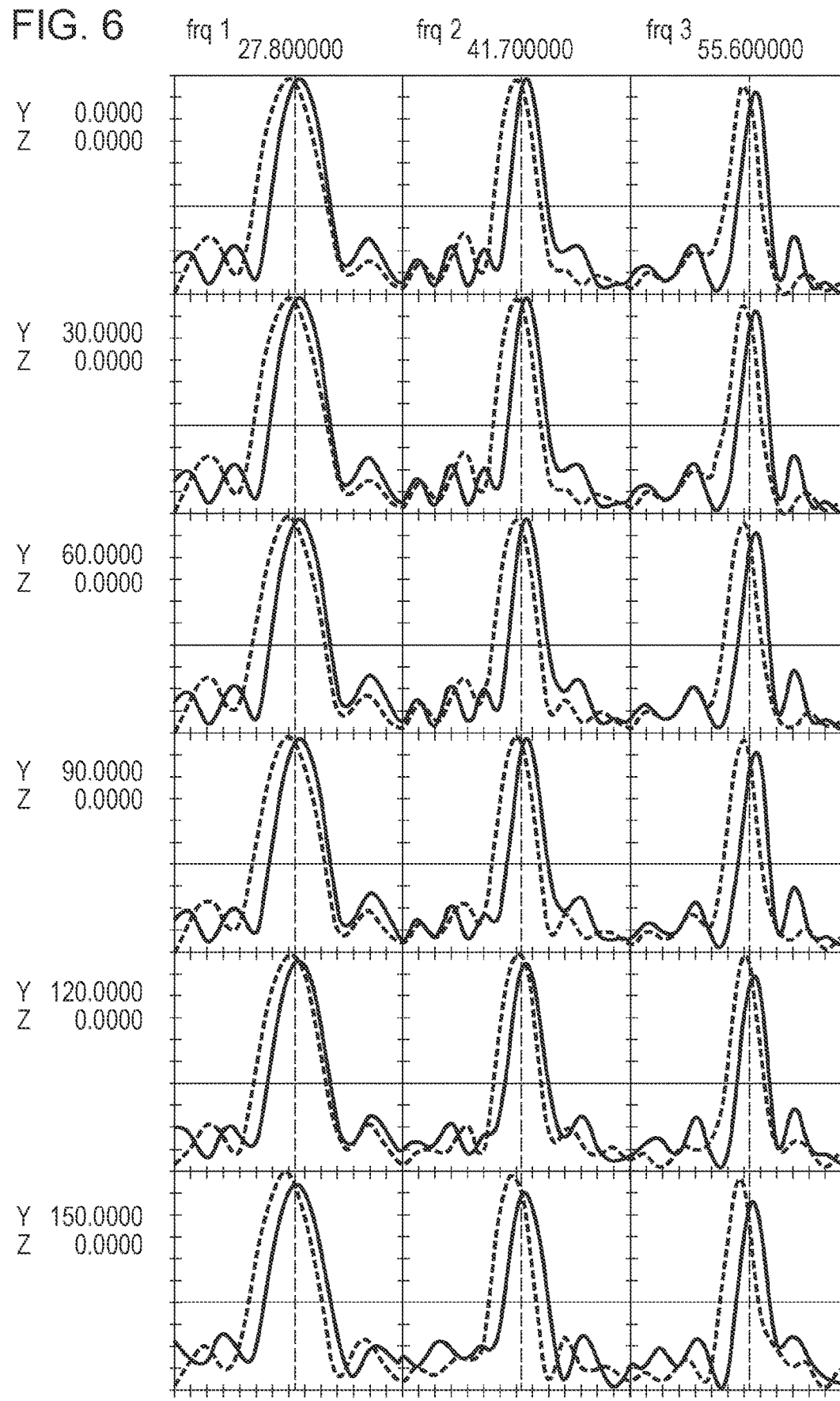
FIG. 6 illustrates the MTF of an optical system in example 1.

FIG. 6 illustrates the MTF (Modulated Transfer Function) of the optical system 10 in the present example. FIG. 6 illustrates the MTF at wavelengths of 700 nm (frq1), 400 nm (frq2), and 1000 nm (frq3) when the object height [mm] in the readout region satisfies Y=0, 30, 60, 90, 120, or 150. As illustrated in FIG. 6, spatial frequencies [number/mm] of each imaging element including the light-receiving surface 7 at the wavelengths are 27.8, 41.7, and 55.6. As seen from FIG. 6, the aberration is successfully corrected over the entire readout region, and the depth of focus is sufficiently ensured.

EXAMPLE 2

An optical system 10 in example 2 of the present invention will now be described. A description of components of the optical system 10 in the present example like to those of the optical system 10 in the example 1 described above is omitted.

FIG. 7 schematically illustrates principal parts of the optical system 10 according to the embodiment of the present invention in the first and second sections. In the optical system 10 in the present example, the length of the optical path from the aperture stop 1 to the light-receiving surface 7 is shorter than that in the optical system 10 in the example 1, and the size of the entire system is further decreased.

In the present example, the distance from the test object to the aperture stop 1 is 300 mm, the width of the readout region in the first direction is 300 mm, and the angle of view in the first section is ±24.46°. In the present example, the wavelength band that is used is 400 nm to 1000 nm, and width of the imaging region on the light-receiving surface 7 in the second direction is 2.7 mm The combined focal lengths of the front group 11 and the rear group 12 in the present example in the first section are −14.21 mm and 16.69 mm, and the combined focal lengths of the front group 11 and the rear group 12 in the second section are 19.33 mm and 11.01 mm Table 4 illustrates the position of the vertex of each optical surface of the optical system 10 in the present example, the direction of a normal at the vertex, and the curvature radius in each section as in the example 1, Table 5 illustrates the shape of each optical surface, and Table 6 illustrates the diameters of the opening of the aperture stop 1, the opening of the light-shielding member 4, and the light-receiving surface 7. Local coordinate systems that differ from each other for positions are defined such that the normal at each of the positions on a primary line expressed as the expression (Math. 1) coincides with the x-axis, and the shape of the third reflection surface 5 in the second section is expressed as the expression (Math. 2) described above. The reason why the values of the curvature radius $R_y$ in Table 4 differ from those in Table 5 is that the tilt angle in the second section is taken into account for the values of the curvature radius in Table 4.

TABLE 4

|  |  | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.096 | 15.449 | | |
| FIRST REFLECTION SURFACE | 2 | 15.000 | 0.000 | 0.000 | −158.94 | 11.302 | 10.765 | −63.9777 | 113.3358 |
| SECOND REFLECTION SURFACE | 3 | 5.990 | 0.000 | −6.824 | 75.87 | 14.941 | 14.891 | −68.3112 | 47.53759 |
| LIGHT-SHIELDING MEMBER | 4 | 7.855 | 0.000 | 8.000 | 90.00 | 14.228 | 14.365 | | |
| THIRD REFLECTION SURFACE | 5 | 10.067 | 0.000 | 22.055 | −118.94 | 12.802 | 12.640 | 36.50615 | 21.0675 |
| FOURTH REFLECTION SURFACE | 6 | 1.624 | 0.000 | 12.431 | 93.72 | 14.525 | 14.603 | 120.0635 | 98.14715 |
| LIGHT-RECEIVING SURFACE | 7 | 16.148 | 0.000 | 12.269 | 0.00 | | | | |

TABLE 5

|  | FIRST REFLECTION SURFACE | SECOND REFLECTION SURFACE | THIRD REFLECTION SURFACE | FOURTH REFLECTION SURFACE |
|---|---|---|---|---|
| $R_y$ | −6.822E+01 | −6.437E+01 | 3.650E+01 | 4.231E+01 |
| $K_y$ | 1.703E+01 | 9.706E+01 | 1.762E−01 | −2.277E+00 |
| $B_2$ | 0.000E+00 | 0.000E+00 | 0.000E+00 | 0.000E+00 |
| $B_4$ | 3.284E−05 | −2.066E−05 | 0.000E+00 | −1.019E−05 |
| $B_6$ | 5.782E−09 | −1.118E−07 | 0.000E+00 | −1.827E−07 |
| r | 9.653E+01 | 3.908E+01 | 2.098E+01 | 4.242E+00 |
| $K_z$ | 0.000E+00 | 2.277E+01 | −7.623E+00 | −1.017E+00 |
| $E_2$ | −6.566E−06 | −1.550E−04 | 0.000E+00 | −7.400E−04 |
| $E_4$ | 1.898E−07 | 1.655E−06 | 0.000E+00 | 6.481E−06 |
| $M_{01}$ | 1.134E−01 | 3.783E−01 | 0.000E+00 | 2.661E+00 |
| $M_{21}$ | −3.028E−04 | −6.369E−04 | 0.000E+00 | 1.253E−03 |
| $M_{41}$ | 2.359E−06 | 1.384E−06 | 0.000E+00 | −4.432E−07 |
| $M_{02}$ | 0.000E+00 | 0.000E+00 | 0.000E+00 | 0.000E+00 |
| $M_{22}$ | 0.000E+00 | 0.000E+00 | 0.000E+00 | 0.000E+00 |
| $M_{42}$ | 0.000E+00 | 0.000E+00 | 0.000E+00 | 0.000E+00 |
| $M_{03}$ | −2.070E−04 | 3.016E−04 | 0.000E+00 | 4.822E−03 |
| $M_{23}$ | 2.280E−06 | 3.468E−06 | 0.000E+00 | −1.638E−04 |
| $M_{43}$ | 0.000E+00 | 0.000E+00 | 0.000E+00 | 6.876E−06 |
| $M_{04}$ | 2.383E−05 | 7.545E−07 | 0.000E+00 | −8.784E−05 |
| $M_{24}$ | −1.916E−07 | 3.838E−06 | 0.000E+00 | 0.000E+00 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | −7.032E−07 | 0.000E+00 | 0.000E+00 |
| $M_{46}$ | 0.000E+00 | 0.000E+00 | 0.000E+00 | 0.000E+00 |
| C1 | | | 1.330E−01 | |
| λ | | | 7.000E−04 | |

TABLE 6

|  | APERTURE STOP | LIGHT-SHIELDING MEMBER | LIGHT-RECEIVING SURFACE |
|---|---|---|---|
| DIAMETER (y) | 31.6 | 3.6 | 7.2 |
| DIAMETER (z) | 3.6 | 0.08 | 5.4 |

Figure 8:
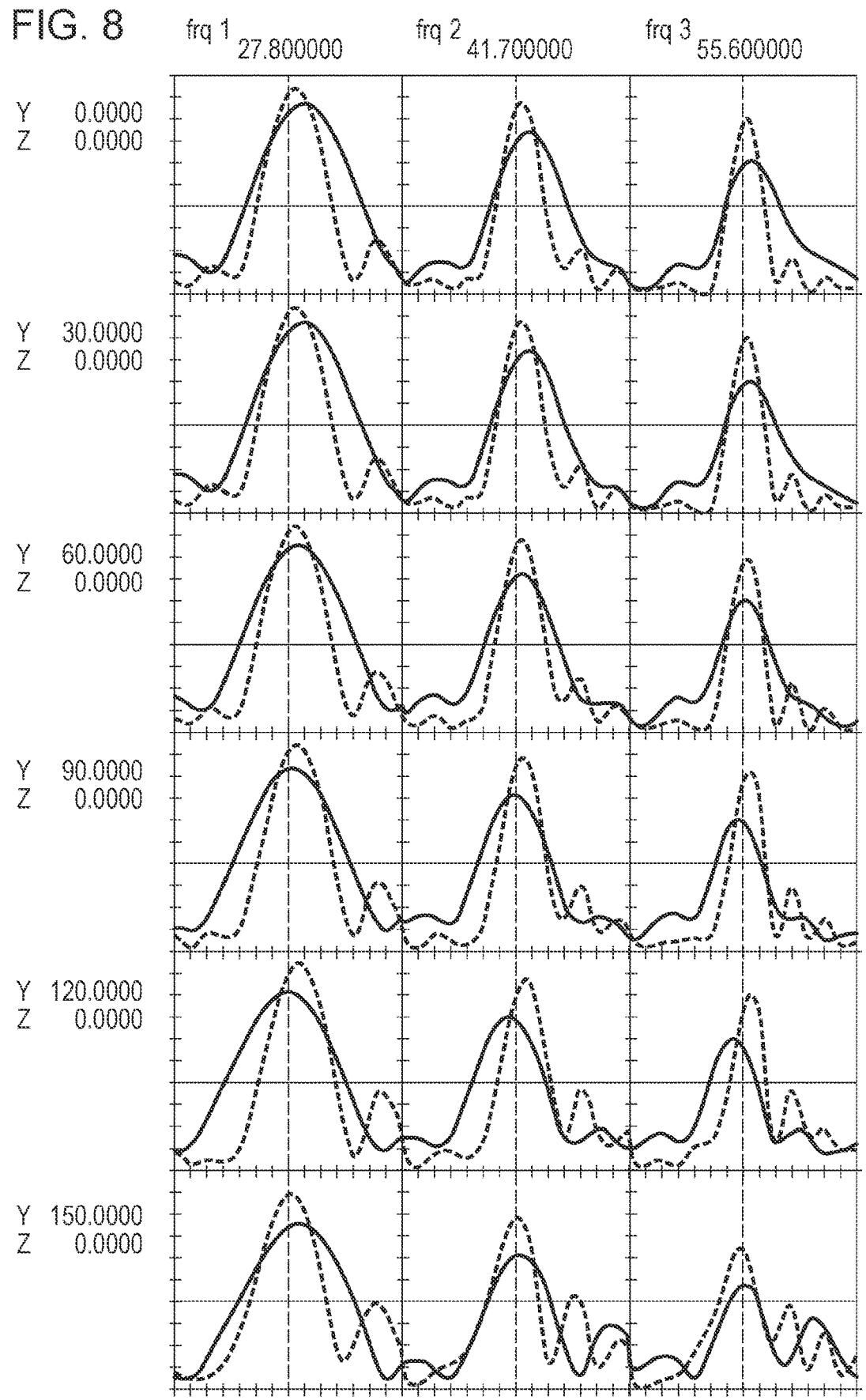
FIG. 8 illustrates the MTF of the optical system in the example 2.

FIG. 8 illustrates the MTF of the optical system 10 in the present example as in FIG. 6. As seen from FIG. 8, the aberration is successfully corrected over the entire readout region, and the depth of focus is sufficiently ensured.

EXAMPLE 3

An optical system 10 in example 3 of the present invention will now be described. A description of components of the optical system 10 in the present example like to those of the optical system 10 in the example 1 described above is omitted.

FIG. 9 schematically illustrates principal parts of the optical system 10 according to the embodiment of the present invention in the first and second sections. The values of Fno of the optical system 10 in the present example for light emission (the image) are smaller (brighter) than those of the optical system 10 in the example 1. Specifically, the values of Fno of the optical system 10 in the example 1 for light emission in the first and second sections are 4.7 and 4.0, and the values of Fno of the optical system 10 in the present example for light emission in the first and second sections are 4.1 and 3.5.

In the present example, the distance from the test object to the aperture stop 1 is 300 mm, the width of the readout region in the first direction is 300 mm, and the angle of view in the first section is ±24.44°. In the present example, the wavelength band that is used is 400 nm to 1000 nm, and the width of the imaging region on the light-receiving surface 7 in the second direction is 2.64 mm The combined focal lengths of the front group 11 and the rear group 12 in the present example in the first section are −14.46 mm and 26.85 mm, and the combined focal lengths of the front group 11 and the rear group 12 in the second section are 19.34 mm and 24.98 mm Table 7 illustrates the position of the vertex of each optical surface of the optical system 10 in the present example, the direction of a normal at the vertex, and the curvature radius in each section as in the example 1, Table 8 illustrates the shape of each optical surface, and Table 9 illustrates the diameters of the opening of the aperture stop 1, the opening of the light-shielding member 4, and the light-receiving surface 7.

TABLE 7

|  |  | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.449 | 15.449 |  |  |
| FIRST REFLECTION SURFACE | 2 | 15.448 | 0.000 | −1.787 | −166.40 | 10.765 | 10.765 | −65.8139 | 113.3369 |
| SECOND REFLECTION SURFACE | 3 | 5.903 | 0.000 | −6.763 | 55.02 | 14.961 | 14.961 | −68.5038 | 47.58075 |
| LIGHT-SHIELDING MEMBER | 4 | 7.855 | 0.000 | 8.070 | 90.00 | 48.207 | 48.207 |  |  |
| THIRD REFLECTION SURFACE | 5 | 14.144 | 0.000 | 55.865 | −115.58 | 22.076 | 22.077 | 64.09489 | 52.67938 |
| FOURTH REFLECTION SURFACE | 6 | 0.295 | 0.000 | 38.674 | 20.44 | 21.609 | 21.609 | 103.114 | 156.1331 |
| LIGHT-RECEIVING SURFACE | 7 | 21.558 | 0.000 | 34.822 | 0.00 |  |  |  |  |

TABLE 8

| | FIRST REFLECTION SURFACE | SECOND REFLECTION SURFACE | THIRD REFLECTION SURFACE | FOURTH REFLECTION SURFACE |
|---|---|---|---|---|
| $R_y$ | −6.581E+01 | −6.850E+01 | 6.409E+01 | 1.031E+02 |
| $K_y$ | −1.000E+00 | −1.000E+00 | −1.000E+00 | −1.000E+00 |
| $B_2$ | 0.000E+00 | 0.000E+00 | 0.000E+00 | 0.000E+00 |
| $B_4$ | 2.975E−05 | −5.799E−05 | −3.950E−07 | 3.816E−06 |
| $B_6$ | −1.050E−08 | −9.859E−07 | 3.956E−11 | −5.352E−09 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | −1.636E−04 | −1.499E−04 | 1.083E−06 | −5.606E−05 |
| $M_{41}$ | 2.424E−06 | 4.838E−06 | 1.598E−09 | −5.157E−08 |
| $M_{02}$ | 4.412E−03 | 1.051E−02 | 9.491E−03 | 3.202E−03 |
| $M_{22}$ | 5.466E−06 | −4.333E−05 | 1.169E−06 | 1.858E−06 |
| $M_{42}$ | 9.041E−08 | 6.697E−07 | −2.866E−10 | −5.249E−09 |
| $M_{03}$ | −3.609E−05 | 1.564E−04 | 1.425E−05 | −2.126E−05 |
| $M_{23}$ | 9.243E−07 | 2.513E−06 | 0.000E+00 | −1.176E−07 |
| $M_{43}$ | −1.031E−09 | −1.452E−07 | 0.000E+00 | 3.731E−11 |
| $M_{04}$ | 2.306E−05 | 3.844E−05 | −7.963E−07 | 1.295E−06 |
| $M_{24}$ | −1.858E−07 | 1.982E−05 | 0.000E+00 | 9.929E−09 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | −7.991E−07 | 0.000E+00 | 0.000E+00 |
| $M_{26}$ | 0.000E+00 | −3.458E−06 | 0.000E+00 | 0.000E+00 |
| $M_{46}$ | 0.000E+00 | 0.000E+00 | 0.000E+00 | 0.000E+00 |
| C1 |  |  | 8.095E−02 |  |
| λ |  |  | 7.000E−04 |  |

TABLE 9

| | APERTURE STOP | LIGHT-SHIELDING MEMBER | LIGHT-RECEIVING SURFACE |
|---|---|---|---|
| DIAMETER (y) | 31.6 | 3.6 | 7.2 |
| DIAMETER (z) | 3.6 | 0.05 | 5.4 |

Figure 10:
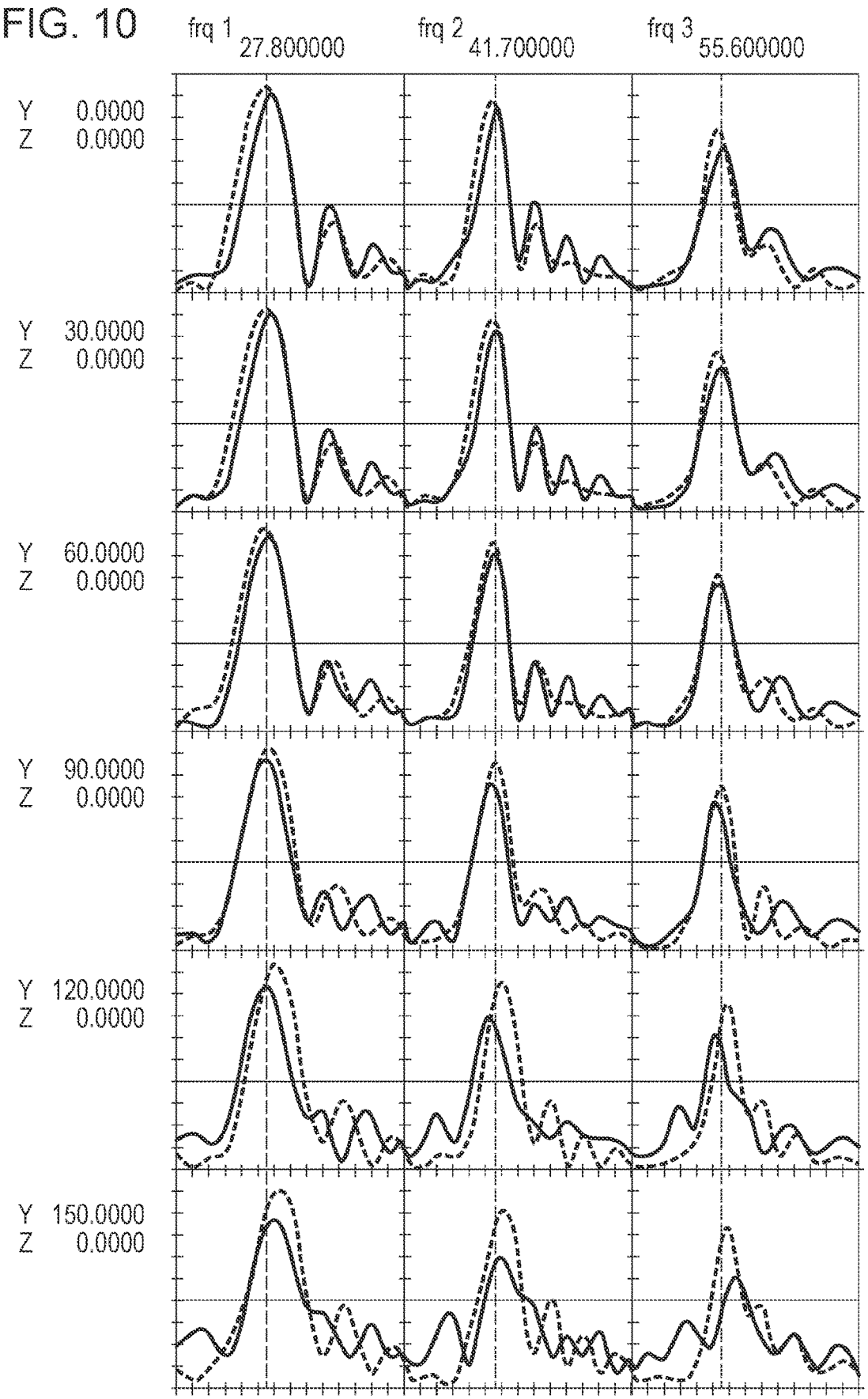
FIG. 10 illustrates the MTF of the optical system in the example 3.

FIG. 10 illustrates the MTF of the optical system 10 in the present example as in FIG. 6. As seen from FIG. 10, the aberration is successfully corrected over the entire readout region, and the depth of focus is sufficiently ensured.

EXAMPLE 4

An optical system 10 in example 4 of the present invention will now be described. A description of components of the optical system 10 in the present example like to those of the optical system 10 in the example 1 described above is omitted.

FIG. 11 schematically illustrates principal parts of the optical system 10 according to the embodiment of the present invention in the first and second sections. In the optical system 10 in the present example, the length of the optical path from the aperture stop 1 to the light-receiving surface 7 is shorter than that in the optical system 10 in the example 1, and the size of the entire system is further decreased.

In the present example, the distance from the test object to the aperture stop 1 is 300 mm, the width of the readout region in the first direction is 300 mm, and the angle of view in the first section is ±24.49°. In the present example, the wavelength band that is used is 400 nm to 1000 nm, and the width of the imaging region on the light-receiving surface 7 in the second direction is 2.37 mm The combined focal lengths of the front group 11 and the rear group 12 in the present example in the first section are −13.23 mm and 16.78 mm, and the combined focal lengths of the front group 11 and the rear group 12 in the second section are 17.53 mm and 11.25 mm Table 10 illustrates the position of the vertex of each optical surface of the optical system 10 in the present example, the direction of a normal at the vertex, and the curvature radius in each section as in the example 1, Table 11 illustrates the shape of each optical surface, and Table 12 illustrates the diameters of the opening of the aperture stop 1, the opening of the light-shielding member 4, and the light-receiving surface 7. The reason why the values of the curvature radius $R_y$ in Table 10 differ from those in Table 11 is that the tilt angle in the second section is taken into account for the values of the curvature radius in Table 10.

TABLE 11

| | FIRST REFLECTION SURFACE | SECOND REFLECTION SURFACE | THIRD REFLECTION SURFACE | FOURTH REFLECTION SURFACE |
|---|---|---|---|---|
| $R_y$ | −6.893E+01 | −5.969E+01 | 3.511E+01 | 7.391E+01 |
| $K_y$ | 2.282E+01 | 4.694E+01 | −2.363E−01 | −7.185E+00 |
| $B_2$ | 0.000E+00 | 0.000E+00 | 0.000E+00 | 0.000E+00 |
| $B_4$ | 2.449E−05 | −2.328E−05 | 0.000E+00 | 8.733E−06 |
| $B_6$ | 4.684E−08 | −3.929E−07 | 0.000E+00 | −1.347E−07 |
| r | −7.730E+06 | 3.417E+01 | 2.122E+01 | 3.940E+00 |
| $K_z$ | 8.356E+04 | 1.676E+01 | −8.549E+00 | 6.524E−01 |
| $E_2$ | −7.041E−01 | 2.606E−03 | 0.000E+00 | 4.684E−03 |
| $E_4$ | 1.281E−01 | −6.394E−05 | 0.000E+00 | −9.506E−05 |
| $M_{01}$ | 8.736E−02 | 1.338E−01 | 0.000E+00 | 2.577E+00 |
| $M_{21}$ | −3.528E−04 | −6.227E−04 | 0.000E+00 | 1.174E−03 |
| $M_{41}$ | 1.876E−06 | −3.362E−06 | 0.000E+00 | −5.369E−06 |
| $M_{02}$ | 0.000E+00 | 0.000E+00 | 0.000E+00 | 0.000E+00 |
| $M_{22}$ | 0.000E+00 | 0.000E+00 | 0.000E+00 | 0.000E+00 |
| $M_{42}$ | 0.000E+00 | 0.000E+00 | 0.000E+00 | 0.000E+00 |
| $M_{03}$ | 4.367E−05 | 4.290E−04 | 0.000E+00 | 6.733E−03 |
| $M_{23}$ | −5.721E−07 | 5.393E−07 | 0.000E+00 | −4.559E−04 |
| $M_{43}$ | 0.000E+00 | 0.000E+00 | 0.000E+00 | 2.610E−05 |
| $M_{04}$ | 1.808E−05 | −8.959E−06 | 0.000E+00 | −3.084E−03 |
| $M_{24}$ | −4.071E−08 | −1.085E−06 | 0.000E+00 | 0.000E+00 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 1.909E−07 | 0.000E+00 | 0.000E+00 |
| $M_{46}$ | 0.000E+00 | 0.000E+00 | 0.000E+00 | 0.000E+00 |
| C1 | | | 1.207E−01 | |
| λ | | | 7.000E−04 | |

TABLE 10

| | | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.096 | 15.515 | | |
| FIRST REFLECTION SURFACE | 2 | 15.000 | 0.000 | 0.000 | −158.94 | 11.790 | 11.068 | −63.6062 | 822.035 |
| SECOND REFLECTION SURFACE | 3 | 5.986 | 0.000 | −7.599 | 65.40 | 15.710 | 15.801 | −61.0899 | 35.63555 |
| LIGHT-SHIELDING MEMBER | 4 | 7.855 | 0.000 | 8.000 | 90.00 | 14.184 | 14.339 | | |
| THIRD REFLECTION SURFACE | 5 | 9.793 | 0.000 | 22.051 | −116.89 | 12.744 | 12.764 | 35.11489 | 21.34854 |
| FOURTH REFLECTION SURFACE | 6 | 1.384 | 0.000 | 12.474 | 95.15 | 14.679 | 14.541 | 207.4402 | 82.28998 |
| LIGHT-RECEIVING SURFACE | 7 | 16.063 | 0.000 | 12.474 | −0.01 | | | | |

TABLE 12

|  | APERTURE STOP | LIGHT-SHIELDING MEMBER | LIGHT-RECEIVING SURFACE |
|---|---|---|---|
| DIAMETER (y) | 30.8 | 3.6 | 7.2 |
| DIAMETER (z) | 3.6 | 0.1 | 5.4 |

In the present example, the secondary-line shapes of the first reflection surface 2, the second reflection surface 3, the third reflection surface 5, and the fourth reflection surface 6 are expressed as an expression described below instead of the expression (Math. 3) described above. Local coordinate systems that differ from each other for positions on the primary line are defined as in the example 2, and the secondary-line shape of the third reflection surface 5 is expressed as the expression (Math. 2) described above.

$$r'=r(1+E2y^2+E4y^4)$$

Figure 12:
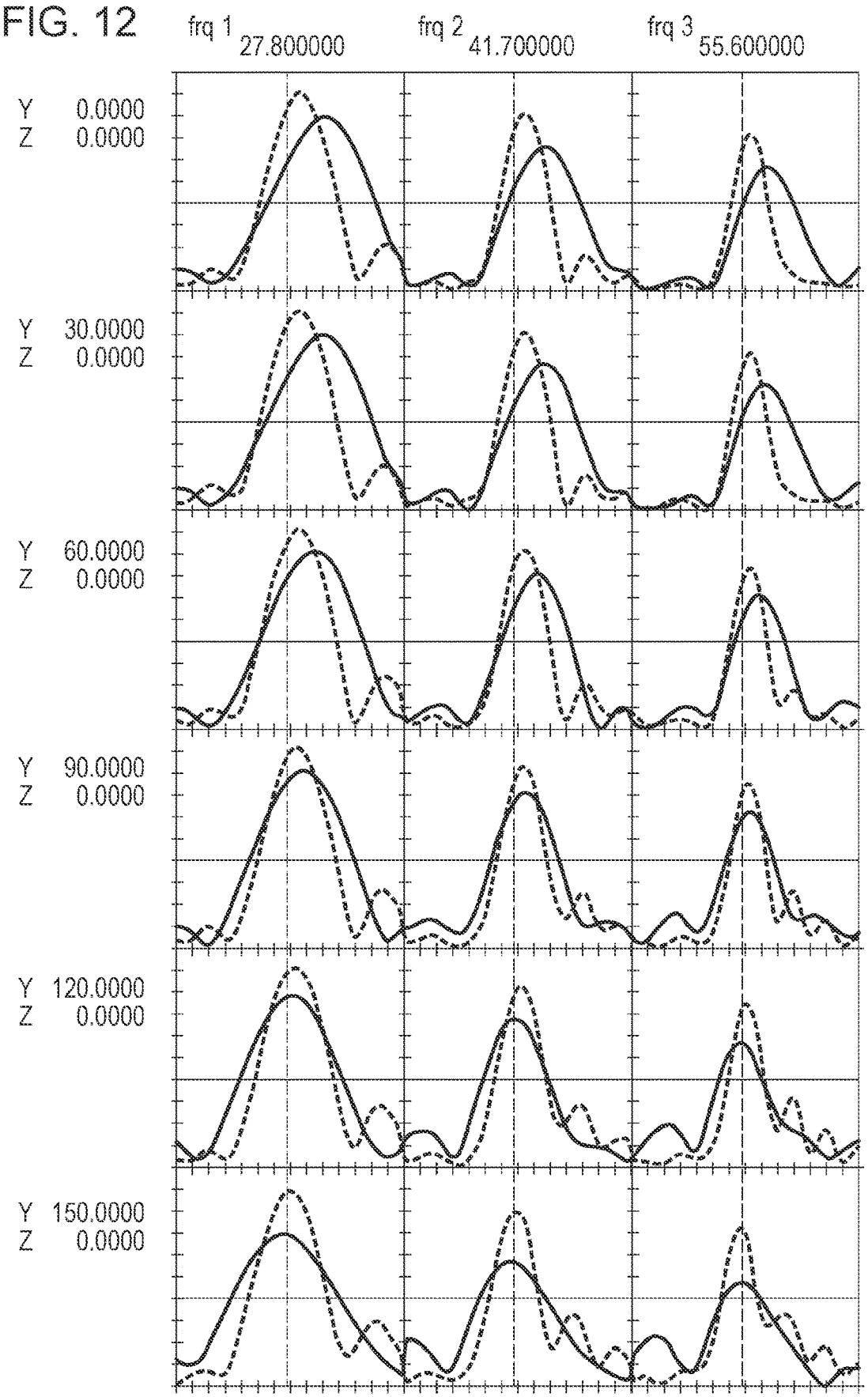
FIG. 12 illustrates the MTF of the optical system in the example 4.

FIG. 12 illustrates the MTF of the optical system 10 in the present example as in FIG. 6. As seen from FIG. 12, the aberration is successfully corrected over the entire readout region, and the depth of focus is sufficiently ensured.

[Imaging Apparatus and Imaging System]

An imaging apparatus (a spectrum reader) and an imaging system (a spectrum reader system) will now be described as usage examples of the optical system 10 according to the embodiment described above.

Figure 13:
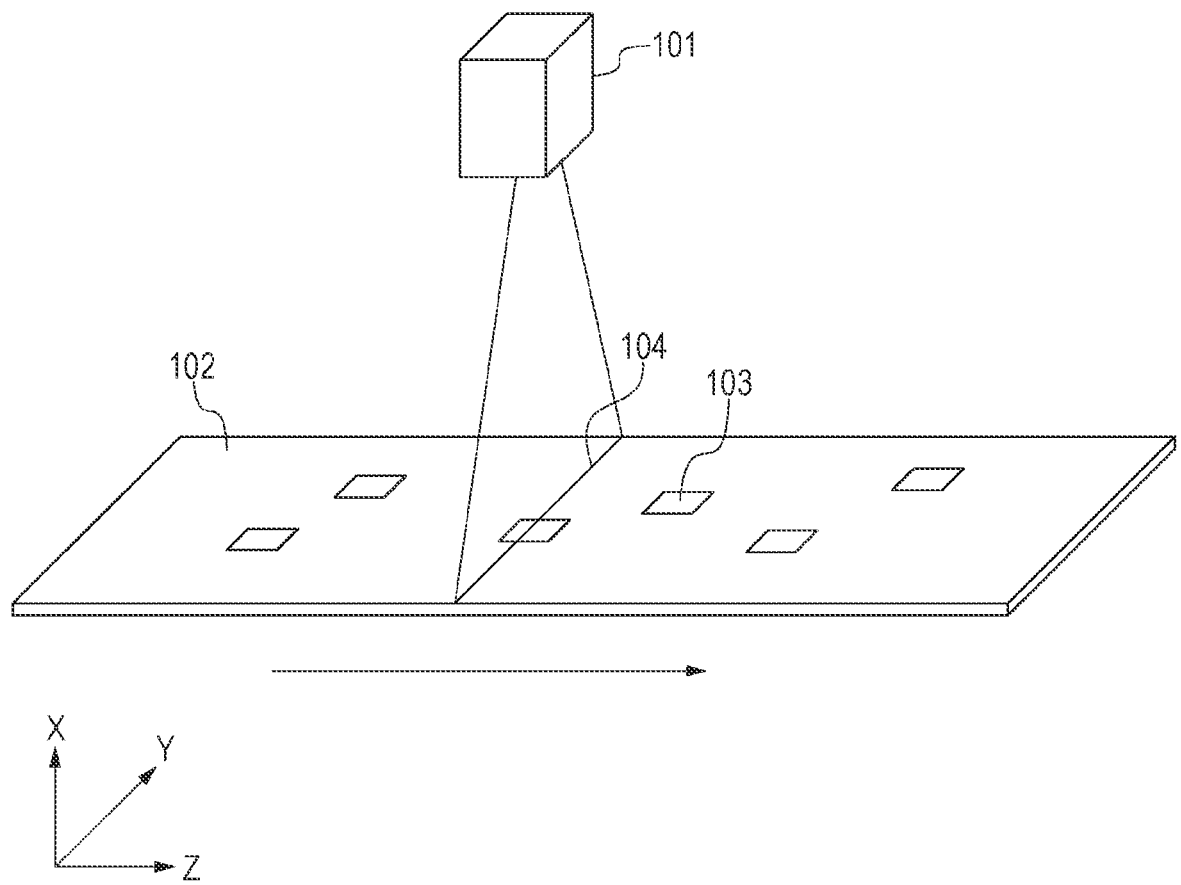
FIG. 13 schematically illustrates principal parts of an imaging system as usage example 1 of the optical system according to the embodiment.
Figure 14:
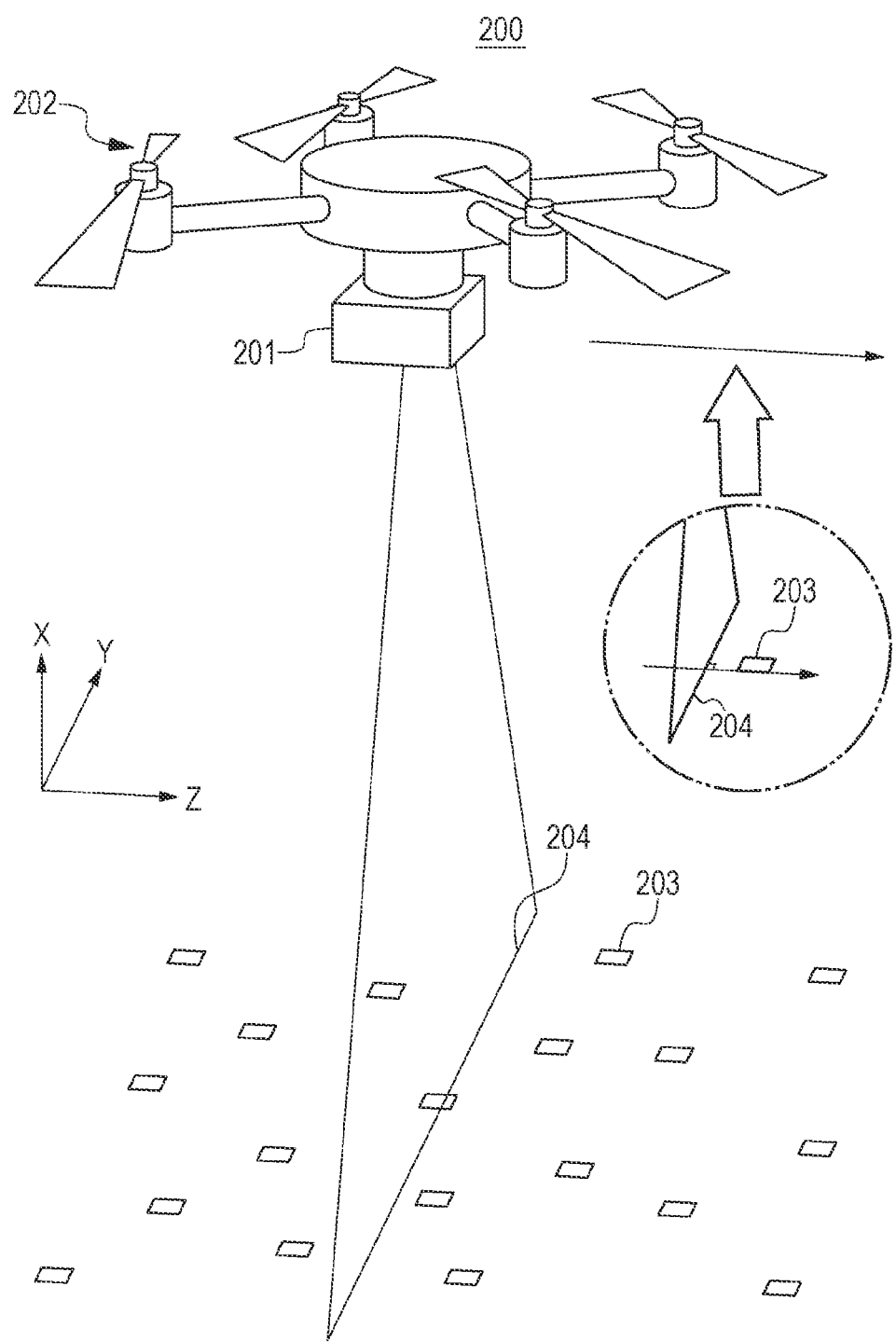
FIG. 14 schematically illustrates principal parts of an imaging system as usage example 2 of the optical system according to the embodiment.

FIG. 13 and FIG. 14 schematically illustrate principal parts of imaging systems 100 and 200 according to the embodiment of the present invention. The imaging systems 100 and 200 include imaging apparatuses 101 and 201 that include imaging elements that receive images that are formed by the optical systems 10 and conveyance units 102 and 202 that change relative positions of the imaging apparatuses and test objects 103 and 203. Each imaging system preferably includes an image-processing unit that generates an image, based on image information that is obtained from the imaging element. The image-processing unit is a processor such as a CPU and may be disposed inside or outside the imaging apparatus.

The imaging apparatuses 101 and 201 image readout regions 104 and 204 in the form of a line elongated in the first direction (the Y-direction) once and can consequently obtain pieces of image information (a one-dimensional image) related to wavelengths. Each imaging apparatus is preferably a multispectral camera that can obtain image information related to four or more kinds of wavelengths, the number of which is larger than that of a typical camera. Each imaging apparatus is more preferably a hyperspectral camera that can obtain image information related to 100 or more kinds of wavelengths.

The imaging elements of the imaging apparatuses can be CCD (Charge Coupled Device) sensors or CMOS (Complementary Metal Oxide Semiconductor) sensors. The imaging elements may be capable of performing photoelectric conversion of infrared light (near-infrared light and far-infrared light) in addition to visible light. Specifically, an imaging element composed of InGaAs or InAsSb may be used depending on the wavelength band that is used. The number of pixels of each imaging element is preferably determined based on resolution obtained in the readout direction and in the spectral direction.

As illustrated in FIG. 13, the conveyance unit 102 of the imaging system 100 moves the test object 103 in the second direction (the Z-direction). The conveyance unit 102 can be, for example, a belt conveyor. As illustrated in FIG. 14, the conveyance unit 202 of the imaging system 200 moves the imaging apparatus 201 in the second direction. The conveyance unit 202 can be, for example, a multi-copter, an airplane, or an artificial satellite. The use of the conveyance unit 202 enables a large test object that cannot be conveyed by, for example, a belt conveyor and a test object that is difficult to move to be imaged at positions in the second direction.

The imaging systems 100 and 200 can obtain pieces of image information related to positions in the second direction in a manner in which the imaging apparatuses image the readout regions in order while the conveyance units change the relative positions of the imaging apparatuses and the test objects. A two-dimensional image related to a specific wavelength can be generated by a calculation process or by changing the arrangement of imaged images by using the image-processing unit. To represent information about light and shade in the first direction by using the image information, spectral distribution (spectral information) may be generated by the image-processing unit, based on pieces of the information about light and shade at the respective wavelengths at a specific position in the second direction.

The conveyance units may move the imaging apparatuses and the test objects. The conveyance units may be capable of adjusting the relative positions of the imaging apparatuses and the test objects in the direction (the X-direction) of the optical axis. An optical member (a focus member) that can be driven may be disposed inside or outside the optical system 10, and the test object may be allowed to be focused by adjusting the position of the optical member.

[Inspection Method and Manufacturing Method]

A method of inspecting an object (the test object) and a method of manufacturing an article by using the optical system 10 according to the embodiment described above will now be described. The optical system 10 is suitable for inspection (evaluation) in industrial fields such as manufacturing industry, agricultural industry, and medical industry.

At a first step (an imaging step) of the inspection method according to the present embodiment, the object is imaged by using the optical system 10 to obtain image information about the object. At this time, the imaging apparatus and the imaging system described above can be used. That is, image information about the entire object can be obtained by imaging the object while the relative positions of the object and the imaging apparatus are changed. Image information of multiple objects can also be obtained in order (continuously). At the first step, pieces of the image information related to the respective wavelengths of light beams that are emitted from the optical system 10 may be obtained.

At a subsequent second step (an inspection step), the object is inspected based on the image information that is obtained at the first step. At this time, for example, a user (an inspector) may check (determine) the presence or absence of a foreign substance or a damage in the image information, or a control unit (the image-processing unit) may detect a foreign substance or a damage in the image information and notifies the user. A control unit that controls an article-manufacturing apparatus described later in accordance with the determination result of the presence or absence of a foreign substance or a damage may be used.

At the second step, the object may be inspected based on the spectral distribution of the object that is obtained by using pieces of the image information at the respective wavelengths. The unique spectral information of the object to be inspected can be detected by using the image information that is obtained by the optical system 10, and the components of the object can be consequently identified. For example, image information may be generated such that the image-processing unit emphasizes color for every spectral distribution, and the user may carry out inspection based on the image information.

The inspection method according to the present embodiment can be used for a method of manufacturing an article such as food, medicine, or cosmetics. Specifically, a material (an object) for manufacturing the article can be inspected by the inspection method described above, and the article can be manufactured by using the inspected material. For example, if it is determined that the material has the foreign substance or the damage at the second step described above, then the user (a manufacturer) or the manufacturing apparatus can remove the foreign substance from the material or can discard the material that has the foreign substance or the damage.

The inspection method described above may be used for inspection of malfunction of the manufacturing apparatus. For example, the presence or absence of malfunction may be determined based on image information about the manufacturing apparatus, and the operation of the manufacturing apparatus may be stopped, or the malfunction may be removed in response to the result of determination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An optical system comprising: a front group; a light-shielding member; and a rear group that are arranged in this order in a direction from a side of an object toward a side of an image, wherein
   the light-shielding member is provided with an opening elongated in a first direction,
   the front group has an aspherical surface, does not image the object at the opening in a first section parallel to the first direction, and forms an intermediate image of the object at the opening in a second section perpendicular to the first direction,
   the rear group has a diffractive surface that splits a light beam that passes through the opening into light beams at different wavelengths in the second section and focuses the light beams on different locations in the second section, and
   a curvature radius of the aspherical surface in the second section at an on-axis position in the first direction differs from that at an outermost off-axis position in the first direction.

2. The optical system according to claim 1, wherein in the second section, the curvature radius of the aspherical surface at the outermost off-axis position is larger than the curvature radius of the aspherical surface at the on-axis position.

3. The optical system according to claim 1, wherein the curvature radius of the aspherical surface in the second section increases in a direction from the on-axis position toward the outermost off-axis position.

4. The optical system according to claim 1, wherein in the second section, the front group and the second group have positive power.

5. The optical system according to claims 1, wherein the front group has first and second aspherical surfaces, each of which has a curvature radius in the second section, the curvature radius at an on-axis position in the first direction differing from that at an outermost off-axis position in the first direction.

6. The optical system according to claim 5, wherein in the second section, a curvature radius of the first aspherical surface at the outermost off-axis position is smaller than that at the on-axis position, and the curvature radius of the second aspherical surface at the outermost off-axis position is larger than that at the on-axis position.

7. The optical system according to claim 5, wherein a curvature radius of the first aspherical surface in the second section decreases in a direction from the on-axis position toward the outermost off-axis position, and the curvature radius of the second aspherical surface increases in the direction from the on-axis position toward the outermost off-axis position.

8. The optical system according to claim 1, wherein a curvature radius of a base surface of the diffractive surface in the second section at an on-axis position in the first direction differs from that at an outermost off-axis position in the first direction.

9. The optical system according to claim 8, wherein refractive power of the diffractive surface in the second section at the on-axis position is the same as that at the outermost off-axis position.

10. The optical system according to claim 1, wherein the rear group has an aspherical surface that has a curvature radius in the second section, the curvature radius at an on-axis position in the first direction differing from that at an outermost off-axis position in the first direction.

11. The optical system according to claim 10, wherein the curvature radius of the aspherical surface of the rear group in the second section decreases in a direction from the on-axis position toward the outermost off-axis position.

12. An imaging apparatus comprising: the optical system according to claim 1; and an imaging sensor that receives an image that is formed by the optical system.

13. An imaging system comprising: the imaging apparatus according to claim 12; and a conveyor that changes relative positions of the imaging apparatus and the object.

14. An inspection method comprising: a first step of imaging an object by using an optical system to obtain image information about the object; and
   a second step of inspecting the object, based on the image information,
   wherein the optical system includes a front group, a light-shielding member, and a rear group that are arranged in this order in a direction from the object toward an image,
   the light-shielding member is provided with an opening elongated in a first direction,
   the front group has an aspherical surface, does not image the object at the opening in a first section parallel to the first direction, and forms an intermediate image of the object at the opening in a second section perpendicular to the first direction,
   the rear group has a diffractive surface that splits a light beam that passes through the opening into light beams at different wavelengths in the second section and focuses the light beams on different locations in the second section, and
   a curvature radius of the aspherical surface in the second section at an on-axis position in the first direction differs from that at an outermost off-axis position in the first direction.

15. The inspection method according to claim 14, wherein the first step includes a step of imaging the object while the object is moved in a direction perpendicular to the first direction.

16. The inspection method of claim 14, wherein the first step includes a step of obtaining pieces of image information related to respective wavelengths of the light beams.

17. The inspection method according to claim 16, wherein the second step includes a step of inspecting the object, based on spectral distribution of the object that is obtained by using the pieces of image information.

18. The inspection method according to claim 14, wherein the second step includes a step of determining presence or absence of a foreign substance in the object.

19. A manufacturing method comprising: a step of inspecting the object by using the inspection method according to claim 14; and a step of manufacturing an article by using the object that is inspected in the step.

20. The manufacturing method according to claim 19, wherein the step of manufacturing the article includes a step of removing a foreign substance in the object.

\* \* \* \* \*